United States Patent
Anand et al.

(10) Patent No.: US 10,976,725 B2
(45) Date of Patent: *Apr. 13, 2021

(54) USER INTERFACE WIDGET MODELING AND PLACEMENT

(71) Applicant: Rockwell Automation Technologies, Inc., Mayfield Heights, OH (US)

(72) Inventors: Ashish Anand, Mayfield Heights, OH (US); Zdenek Kodejs, Prague (CZ); Vojtech Sipek, Mělník (CZ); Damon R Purvis, Aliso V iejo, CA (US); Scott N. Sandler, Chargin Falls, OH (US)

(73) Assignee: Rockwell Automation Technologies, LLC, Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,526

(22) Filed: Dec. 16, 2019

(65) Prior Publication Data

US 2020/0117172 A1  Apr. 16, 2020

Related U.S. Application Data

(63) Continuation of application No. 15/348,294, filed on Nov. 10, 2016, now Pat. No. 10,509,394.

(Continued)

(51) Int. Cl.
*G05B 19/4155* (2006.01)
*G06F 8/34* (2018.01)
*G06F 9/451* (2018.01)

(52) U.S. Cl.
CPC .......... *G05B 19/4155* (2013.01); *G06F 8/34* (2013.01); *G06F 9/451* (2018.02); *G05B 2219/31368* (2013.01); *G05B 2219/32128* (2013.01)

(58) Field of Classification Search
CPC ...... G05B 19/4155; G05B 2219/31368; G05B 2219/32128; G06F 8/34; G06F 9/451
See application file for complete search history.

(56) References Cited

U.S. PATENT DOCUMENTS 6,243,092 B1 *  6/2001  Okita .................... G06F 8/34
                                              700/83
7,337,950 B2 *  3/2008  DeVault ............. G06Q 10/10
                                              235/376

(Continued)

FOREIGN PATENT DOCUMENTS

| EP | 1077404 A2 | 2/2001 |
| EP | 1988454 A1 | 5/2008 |
| WO | 2010037145 A2 | 4/2010 |

OTHER PUBLICATIONS

European Search Report, European Application No. 16 199 063.5 dated Apr. 26, 2017, 8 pages.

*Primary Examiner* — Yasser A Abdelaziez

(57) ABSTRACT

Techniques to facilitate visualization of an application associated with an industrial automation environment are disclosed. In at least one implementation, a display composer interface is presented that enables a user to design a customized display layout for the application associated with the industrial automation environment. Data display instructions are received comprising a user selection of at least one data item associated with an operation of a machine in the industrial automation environment. Position information that identifies where to display the at least one data item is also received. The data display instructions and the position information are processed to generate the customized display layout for the application. Based on the customized display layout, a graphical user interface is rendered to the application having the at least one data item positioned according to the position information.

20 Claims, 23 Drawing Sheets

Related U.S. Application Data

(60) Provisional application No. 62/255,611, filed on Nov. 16, 2015.

(56) References Cited

U.S. PATENT DOCUMENTS

| | | | |
|---|---|---|---|
| 7,739,325 B1* | 6/2010 | Okita | H04M 3/51 |
| | | | 709/200 |
| 2005/0047645 A1* | 3/2005 | Funk | G05B 19/41865 |
| | | | 382/145 |

\* cited by examiner

FIGURE 3

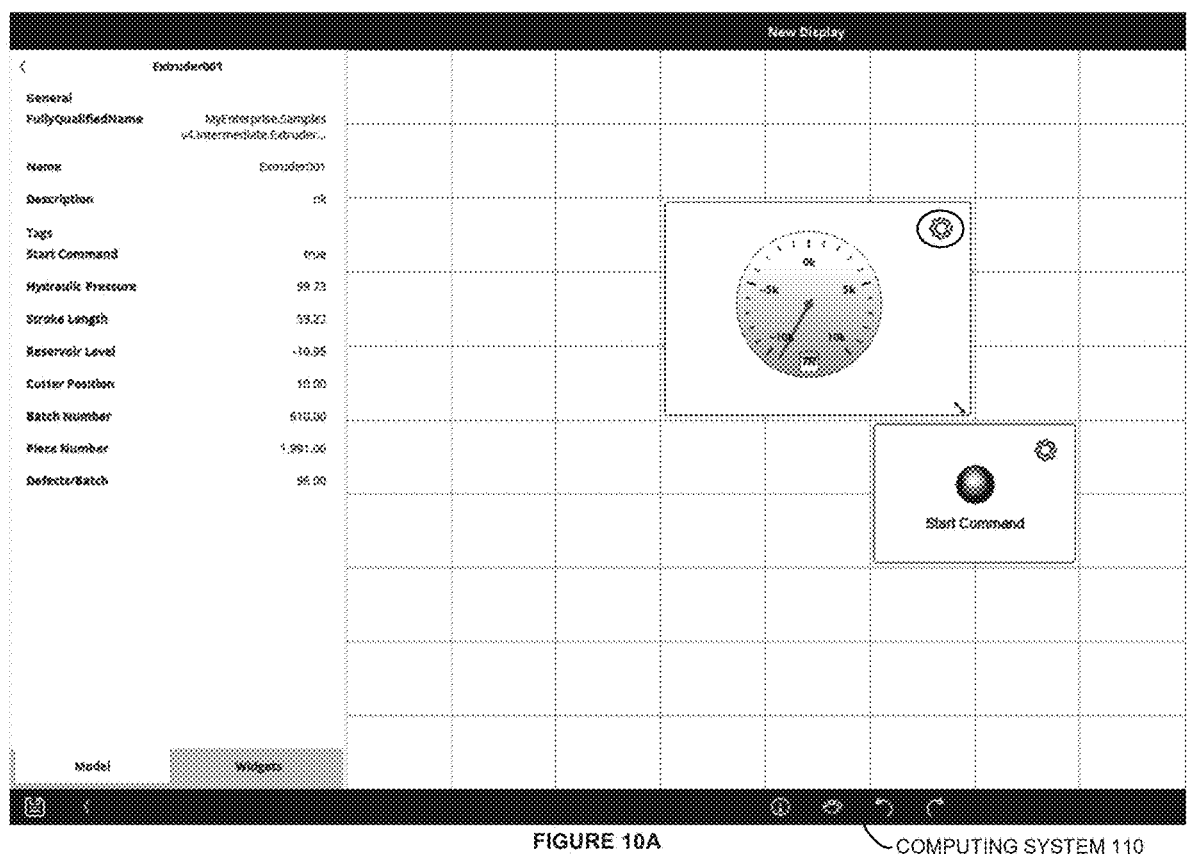
FIGURE 10A — COMPUTING SYSTEM 110

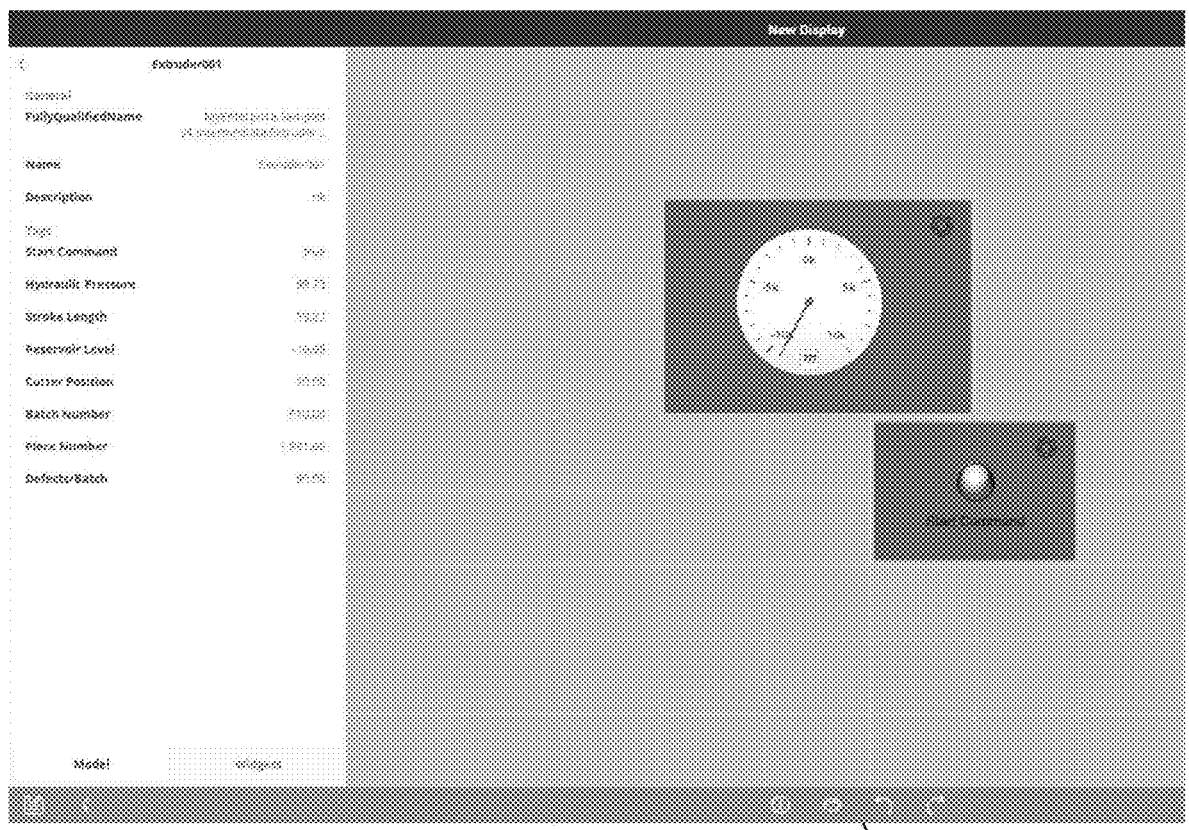
FIGURE 11D — COMPUTING SYSTEM 110

USER INTERFACE WIDGET MODELING AND PLACEMENT

RELATED APPLICATIONS

This application is a continuation of, and claims the benefit of priority to, U.S. Pat. No. 10,509,394, granted on Dec. 17, 2019, and entitled "USER INTERFACE WIDGET MODELING AND PLACEMENT," which itself claims the benefit of, and priority to, U.S. Provisional Patent Application No. 62/255,611, also entitled "USER INTERFACE WIDGET MODELING AND PLACEMENT", and filed on Nov. 16, 2015, both of which are hereby incorporated by reference in their entirety for all purposes.

TECHNICAL FIELD

Aspects of the disclosure are related to computing hardware and software technology, and in particular to industrial automation applications.

TECHNICAL BACKGROUND

Industrial automation environments utilize machines during the industrial manufacturing process. These machines typically have various moving parts and other components that continually produce operational data over time, such as pressure, temperature, speed, and other metrics. Reviewing and monitoring this operational data is of high importance to those involved in operating the industrial automation environment.

In some cases, the operational data may be provided for display on a variety of systems and devices, such as notebook or tablet computers running standalone applications, web browsers, and the like, in order to present the information to the user. For example, a tablet computer could receive a constant stream of the operational data over a network and display this information dynamically, such as by providing live tiles, icons, charts, trends, and other graphical representations which continually receive updated operational data from external data sources, which are typically located in the industrial automation environment.

Overview

Provided herein are systems, methods, and software to facilitate visualization of an application associated with an industrial automation environment. In at least one implementation, a display composer interface is presented that enables a user to design a customized display layout for the application associated with the industrial automation environment. Data display instructions are received comprising a user selection of at least one data item associated with an operation of a machine in the industrial automation environment. Position information that identifies where to display the at least one data item is also received. The data display instructions and the position information are processed to generate the customized display layout for the application. Based on the customized display layout, a graphical user interface is rendered to the application having the at least one data item positioned according to the position information.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 2-11D are block diagrams that illustrate various operational scenarios involving a computing system in an industrial automation environment in exemplary implementations.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for improved visualizations of information items associated with applications executing on a computing system. In one implementation, an application associated with an industrial automation environment may display a graphical user interface showing one or more key performance indicators (KPIs) related to industrial operations. For example, the graphical user interface could display KPIs related to operational data associated with machines in the industrial automation environment, such as parameters, pressures, temperatures, speeds, production rates, or some other status metrics. In some examples, the operational data for some KPIs may comprise dynamic charts or trends, real-time video, or some other graphical content.

By interacting with the graphical user interface, a user may utilize a display composer to select one or more of the KPIs for display by the application, along with position information that identifies where on the screen to display each of the selected KPIs. In some implementations, the user can also define the size, shape, display style (i.e., gauge, trend, chart, indicator, or some other display type), and other properties of each KPI that is selected for display. In this manner, the user is able to create a customized display screen that presents the selected manufacturing data in the arrangement and style desired by the user. This custom display layout can be saved so that the visualization of the data as defined by the user may be presented at a later time. When viewing the user-defined display, the application may provide a "live feed" of dynamic KPI data for display according to the arrangement, style, and other properties defined by the user. This feed of dynamic KPI data may be continuously updated by the application so that the visualization of the KPI displayed shows the most current information associated with the KPI.

Figure 1A:
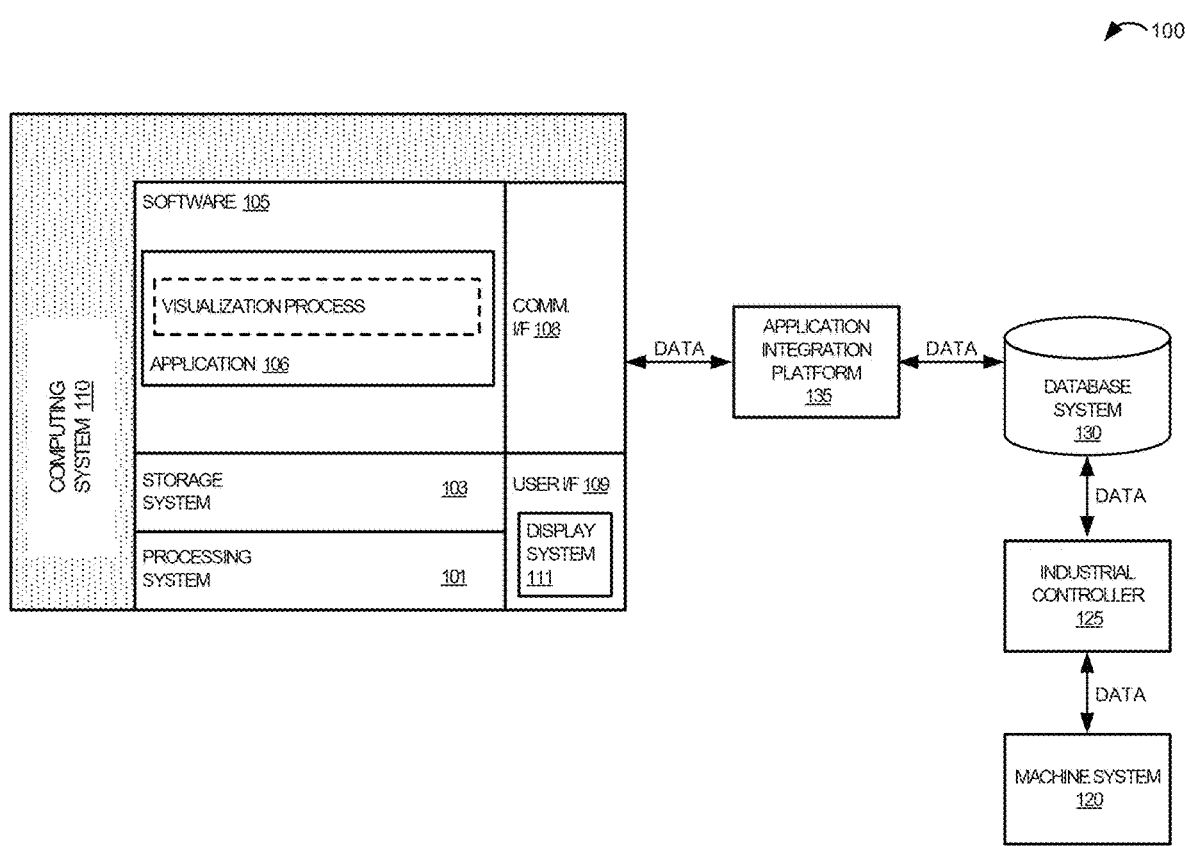
FIG. 1A is a block diagram that illustrates an industrial automation environment in an exemplary implementation.
Figure 1B:
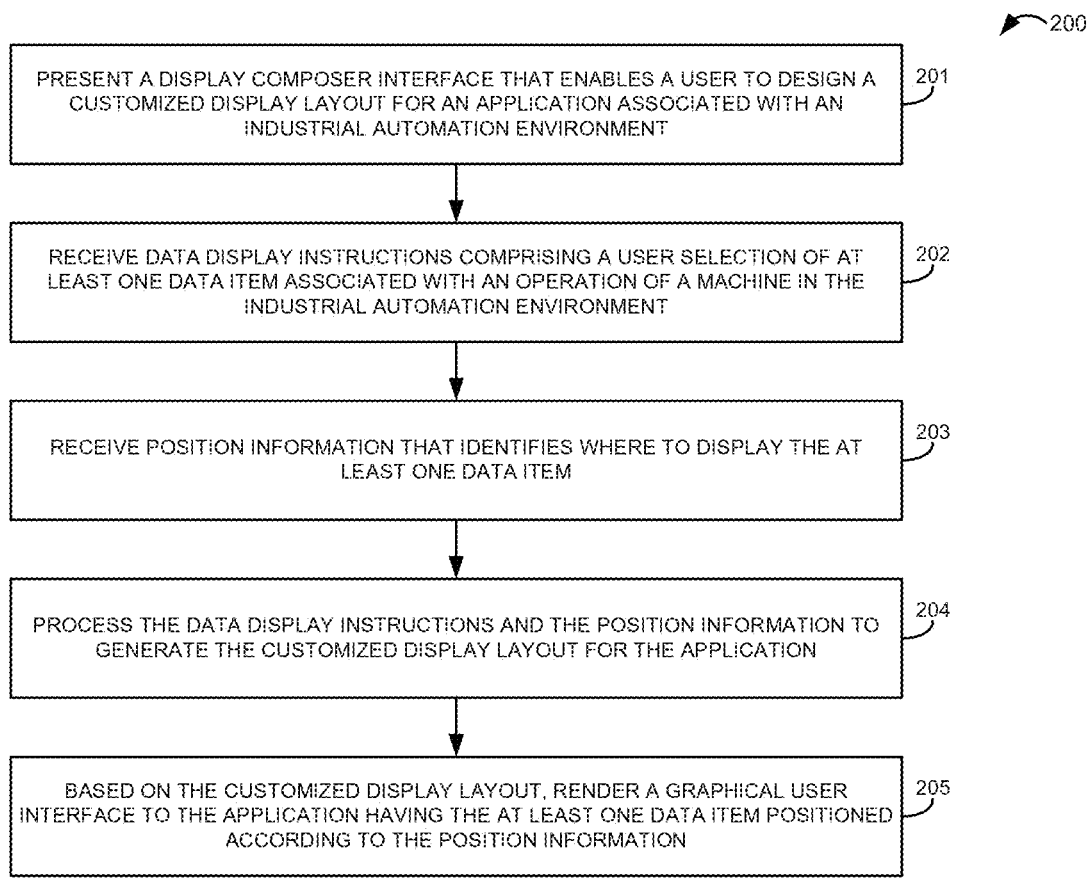
FIG. 1B is a flow diagram that illustrates an operation of a computing system in an exemplary implementation.

Referring now to the drawings, FIG. 1A illustrates an exemplary industrial automation environment that includes a computing system that may be used to execute an application and its visualization process, and FIG. 1B illustrates an operation of a computing system in an exemplary implementation. FIGS. 2-11D illustrate several operational scenarios involving a computing system according to various exemplary implementations. FIG. 12 illustrates an exemplary computing system that may be used to perform any of the visualization processes and operational scenarios described herein.

Turning now to FIG. 1A, a block diagram that illustrates an industrial automation environment 100 in an exemplary implementation is shown. Industrial automation environment 100 provides an example of an industrial automation environment that may be utilized to implement the visualization processes disclosed herein, but other environments could also be used. Industrial automation environment 100 includes computing system 110, machine system 120, industrial controller 125, database system 130, and application integration platform 135. Machine system 120 and controller 125 are in communication over a communication link, controller 125 and database system 130 communicate over a communication link, database system 130 and application integration platform 135 communicate over a communication link, and application integration platform 135 and computing system 110 are in communication over a communication link. Note that there would typically be many more machine systems in most industrial automation environments, but the number of machine systems shown in FIG. 1A has been restricted for clarity.

Industrial automation environment 100 comprises an automobile manufacturing factory, food processing plant, oil drilling operation, microprocessor fabrication facility, or some other type of industrial enterprise. Machine system 120 could comprise a sensor, drive, pump, filter, drill, motor, robot, fabrication machinery, mill, printer, or any other industrial automation equipment, including their associated control systems. A control system comprises, for example, industrial controller 125, which could include automation controllers, programmable logic controllers (PLCs), or any other controllers used in automation control. Additionally, machine system 120 could comprise other industrial equipment, such as a brew kettle in a brewery, a reserve of coal or other resources, or any other element that may reside in an industrial automation environment 100.

Machine system 120 continually produces operational data over time. The operational data indicates the current status of machine system 120, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 120 and/or controller 125 is capable of transferring the operational data over a communication link to database system 130, application integration platform 135, and computing system 110, typically via a communication network. Database system 130 could comprise a disk, tape, integrated circuit, server, or some other memory device. Database system 130 may reside in a single device or may be distributed among multiple memory devices.

Application integration platform 135 comprises a processing system and a communication transceiver. Application integration platform 135 may also include other components such as a router, server, data storage system, and power supply. Application integration platform 135 may reside in a single device or may be distributed across multiple devices. Application integration platform 135 may be a discrete system or may be integrated within other systems—including other systems within communication system 100. In some examples, application integration platform 135 could comprise a FactoryTalk® VantagePoint server system provided by Rockwell Automation, Inc.

Computing system 110, referred to in FIGS. 1-12, may be representative of any computing apparatus, system, or systems on which the visualization processes disclosed herein or variations thereof may be suitably implemented. Computing system 110 provides an example of a computing system that could be used as a either a server or a client device in some implementations, although such devices could have alternative configurations. Examples of computing system 110 include mobile computing devices, such as cell phones, tablet computers, laptop computers, notebook computers, and gaming devices, as well as any other type of mobile computing devices and any combination or variation thereof. Examples of computing system 110 also include desktop computers, server computers, and virtual machines, as well as any other type of computing system, variation, or combination thereof.

Computing system 110 includes processing system 101, storage system 103, software 105, communication interface 108, and user interface 109. Processing system 101 is operatively coupled with storage system 103, communication interface 108, and user interface 109. Processing system 101 loads and executes software 105 from storage system 103. Software 105 includes a visualization process. When executed by computing system 110 in general, and processing system 101 in particular, software 105 directs computing system 110 to operate as described herein for a visualization process or variations thereof. Computing system 110 may optionally include additional devices, features, or functionality not discussed here for purposes of brevity. An exemplary operation of computing system 110 to facilitate visualization of an application associated with an industrial automation environment will now be discussed with respect to FIG. 1B.

FIG. 1B is a flow diagram that illustrates an operation 200 in an exemplary implementation. The operation 200 shown in FIG. 1B may also be referred to as visualization process 200 herein. The steps of the operation are indicated below parenthetically. The following discussion of operation 200 will proceed with reference to computing system 110 and machine system 120 of FIG. 1A in order to illustrate its operations, but note that the details provided in FIG. 1A are merely exemplary and not intended to limit the scope of process 200 to the specific implementation shown in FIG. 1A.

Operation 200 may be employed to operate a computing system to facilitate visualization of an application associated with an industrial automation environment, such as industrial automation environment 100 of FIG. 1A. Typically, operation 200 may be performed by computing system 110, although operation 200 could be executed by any system or device in some implementations. As shown in the operational flow of process 200, computing system 101 presents a display composer interface that enables a user to design a customized display layout for an application associated with an industrial automation environment (201). In some examples, the display composer interface provides a visualization layout editor for the user to customize the display of an industrial automation application. For example, the user may utilize the display composer interface to select desired data items for viewing and the display types/styles for presenting that data, along with the arrangement of the various data items and their display types in order to create a customized display layout. In at least one implementation, the display composer interface provides at least one selection menu and a display canvas comprising a grid for designing the customized display layout. For example, the display composer interface could provide both a model toolbox panel menu for selecting various data items and a widget toolbox panel menu for selecting different data display types, such as value boxes, indicators, gauges, and the like. The user can then either drag a particular data display type from the widget toolbox panel to the display canvas to create a display item of a particular type, and then assign a specific data item to that display type, or the user can drag a data item from the model toolbox panel menu to the canvas, in which case a default display type will be created for the selected data item and to which the data item will automatically be assigned. Typically, during the drag of either a data display type from the widget toolbox panel or a data item from the model toolbox panel over the grid on the display canvas, a placeholder will appear on the grid to indicate the position where the widget will be inserted after the drop. Other implementations and functionality of the display composer interface are possible and within the scope of this disclosure.

After presenting the display composer interface, computing system 110 receives data display instructions comprising a user selection of at least one data item associated with an operation of a machine in the industrial automation environment (202). For example, in at least one implementation, the user selection of the at least one data item could comprise one or more key performance indicators (KPIs) related to industrial operations, such as KPIs related to operational data associated with machine system 120 of industrial automation environment 100, such as parameters, pressures, temperatures, speeds, production rates, or some other status metrics. Each data item selected by the user in the data display instructions typically includes an associated data display type, such as indicators, value boxes, gauges, plots, trends, charts, grids, visualizations of vessels such as tanks or vats, or any other data visualization types. In some examples, the data display types for some data items may comprise dynamic charts or trends, real-time video, or some other live graphical content. Further, in some implementations, the user can also define the size, shape, display style (i.e., gauge, trend, chart, indicator, value box, or some other display type), and other properties of each data item that is selected for display in the data display instructions. For example, the user could select the desired data display type when providing the data display instructions, such that receiving the data display instructions comprises receiving a data display type for displaying the at least one data item. Further, in some implementations, receiving the data display instructions could comprise receiving display size instructions for the at least one data item. For example, the display size instructions could indicate the size of an associated data display type for each of the data items selected by the user in the data display instructions. In addition to the above, other customized properties and layout design options may be included in the data display instructions are within the scope of this disclosure.

Computing system 110 also receives position information that identifies where to display the at least one data item (203). Typically, to provide the position information, the user drags a data item or a data display type from a selection menu to a display canvas area of the display composer interface and positions the data item as desired. In at least one implementation, the display canvas comprises a grid for designing the customized display layout, which provides the user with a placement guide for positioning the various data items and/or data display types. The position information typically includes the desired display locations for one or more of the data items and/or data display types as indicated by the user.

Computing system 110 processes the data display instructions and the position information to generate the customized display layout for the application (204). Typically, computing system 110 is able to generate the customized display layout for the application based on the various data items and/or data display types indicated in the data display instructions and arranged on the display screen as indicated in the position information. As discussed above, the data display instructions could also include other customized display information such as sizes, shapes, styles, and other properties attributed to the data items and their associated data display types. Further, in at least one implementation, processing the data display instructions and the position information to generate the customized display layout for the application could comprise altering the position information that identifies where to display the at least one data item to avoid overlapping with other data items that were previously positioned in the customized display layout. For example, if a user initially places a data item and/or its corresponding data display type at a specific position in the grid, and subsequently drags another data display type over the location on the grid occupied by the display type of the previously-placed data item, this avoiding mechanism will relocate the display type of the initial data item that the newly placed display type is colliding with to make room for the display type of the new data item. From the user's perspective, this avoiding mechanic will typically operate while the user is providing the data display instructions and the position information while designing the customized display layout for the application, and will also operate when data display types are resized and the resulting larger size causes the resized display type to overlap another data display type that was already positioned on the canvas grid.

Based on the customized display layout, computing system 110 renders a graphical user interface to the application having the at least one data item positioned according to the position information (205). Typically, after designing the customized display layout, when the user launches the application, computing system 110 renders a graphical user interface to the application based on the customized display layout, which results in the at least one data item positioned according to the position information. The desired data items are thus displayed to the user in the selected data display types and arranged according to the user's position instructions, which provides the user with the most optimized and beneficial interface to the application for that particular user.

Advantageously, the above techniques enable a user of an industrial automation application to design a customized display layout that may be used to render a graphical user interface to the application according to the user's specifications. By providing the data display instructions and the position information using the display composer interface, the user is able to fully customize the display of information when subsequently executing the industrial automation application. In this manner, the techniques described herein provide the technical advantage of electronically storing customized display layouts of industrial information that may be used to render different graphical user interfaces to an industrial automation application for a multitude of users. Further, by providing only the data items and data display types selected by each individual user when designing their customized display layouts, the load on the processors, mechanical components, and other elements of an industrial automation environment may be reduced, resulting in significant energy savings by avoiding unnecessary operations. In this manner, a user of an application in an industrial automation environment is presented with only the data items selected by the user contained in data display types arranged according to the user's specifications, thereby optimizing the utility of the application for the user and greatly enhancing the user experience.

Several illustrative examples of various possible implementations of the above visualization techniques will now be discussed. The following examples as illustrated in FIGS. 2 through 11D could be executed by computing system 110 and other elements of industrial automation environment 100, and could also be combined with operation 200 of FIG. 1B in some implementations.

Figure 2:
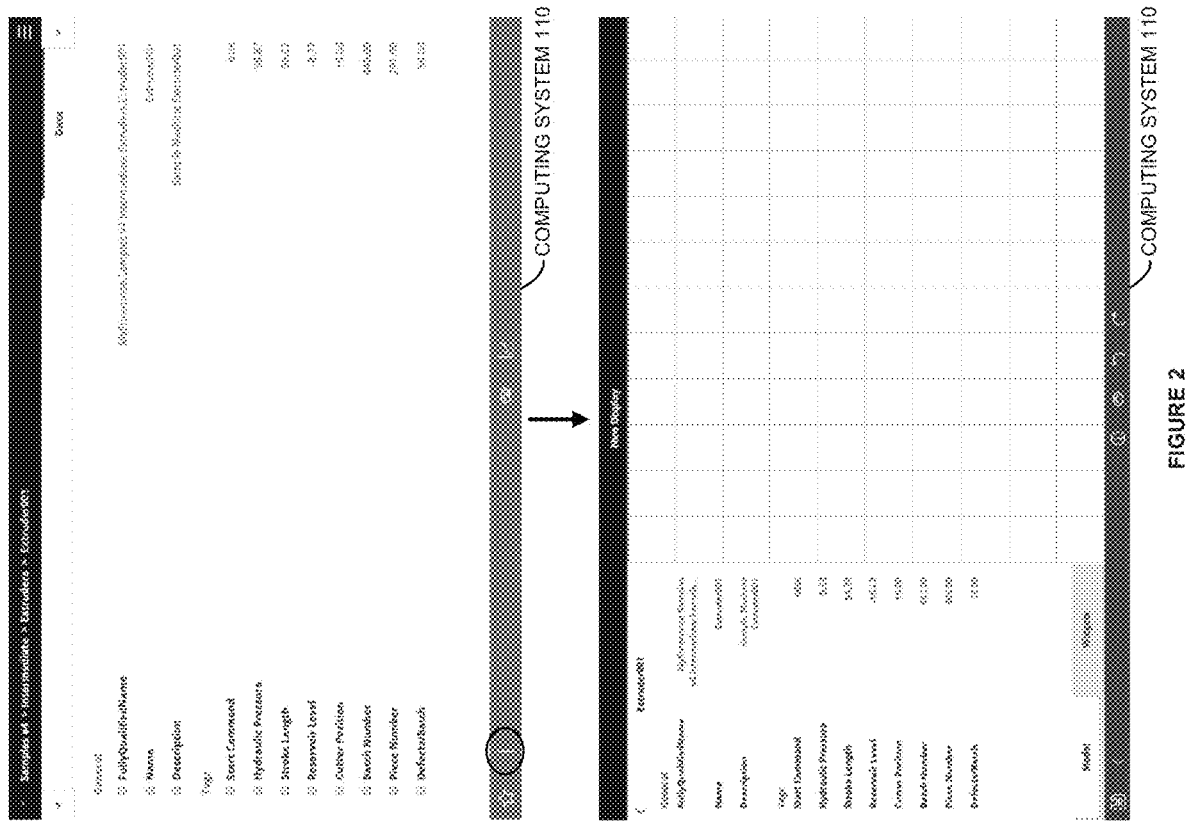

FIG. 2 is a block diagram that illustrates an operational scenario involving computing system 110 in an exemplary implementation. As shown in FIG. 1A, computing system 110 includes user interface 109, which in turn comprises display system 111. In this example, user interface 109 and display system 111 comprise a touch screen that displays a graphical user interface for the user to interact with and accepts input commands from the user via the user's touch on the surface of the touch screen. However, user input could be provided by a variety of different techniques in other examples, such as entering text commands with a keyboard, clicking a mouse pointer, speaking a voice command, or any other user input mechanism.

FIG. 2 illustrates two different display screens that may appear on display system 111 of computing system 110. In the display screen appearing at the top of FIG. 2, the user is presented with a user interface for an application associated with an industrial automation environment, such as the environment 100 illustrated in FIG. 1A. As shown in the display screen appearing at the top of FIG. 2, the user interface presents data associated with a machine named "Extuder001". At the bottom left-hand corner of this display, the user can select an option to open a new display composer interface, which in this example is designated with a "plus" icon, although any graphic, text, or other indicator could be used to open a new display composer in other examples. To facilitate this discussion, a circle surrounds the "plus" icon in this example to highlight the "new display composer" option, but note that the plus icon is not typically encircled on the application's user interface. Also, the user can open the composer at any level of the model hierarchy. Once the user selects the "plus" icon to open the display composer, the user is presented with the display composer interface, as shown in the display screen appearing at the bottom of FIG. 2. The details of the display composer interface will now be described with respect to FIG. 3.

Figure 3:
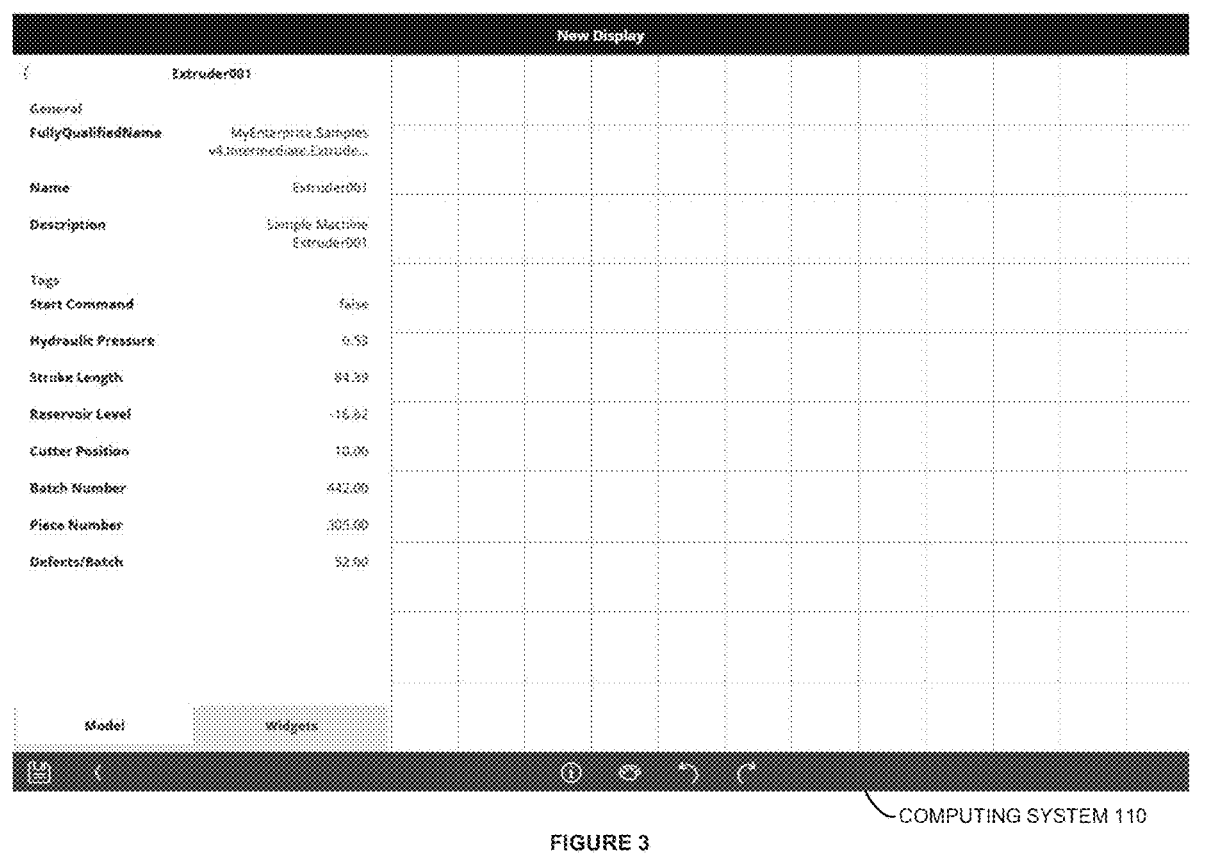

FIG. 3 is a block diagram that illustrates an operational scenario involving computing system 110 in an exemplary implementation. In FIG. 3, an exemplary interface that enables a user to compose and edit custom displays is shown on the display screen of computing system 110, labeled "New Display". In some examples, the user may access this display creation interface by selecting an option to create a new display as discussed above with respect to FIG. 2.

In this example, the display composer interface includes two sections, divided into a menu on the left-hand side and a display composer on the right, although these windows could appear anywhere on the screen in other examples. The menu in the left-hand pane provides various models and widgets that provide visualizations of operational data items, and the composer section in the right-hand pane provides a blank canvas that may be used to arrange the data items as the user desires them to be presented. In this example, the display composer canvas comprises a visualization of a grid onto which the user can insert and position various widgets that display operational data. The gridlines displayed in the composer canvas assist the user in positioning the various widgets and data items when designing a custom display.

As shown in the menu on left-hand side of the display composer, the user can select from either a list of widgets or a list of models, and these lists are selected by the tabs labeled "Model" and "Widgets" at the bottom of the left-hand side pane. In FIG. 2, the "Model" tab is selected, which provides various information and data values for a particular machine or model. The heading at the top of the "Model" tab on left-hand side pane is labeled "Extruder001", which indicates that the information listed below is associated with the "Extruder001" model. Under the "General" heading, various identifying information about the model is presented, such as the fully qualified name (file name), model name, and description. Under the "Tags" heading, various data values are presented, such as whether or not the machine has received a start command, hydraulic pressure, stroke length, reservoir level, cutter position, batch number, piece number, the number of defects per batch, and the like. Of course, the number and type of data values that are shown in FIG. 3 will differ depending on the type of model or machine selected; the ones shown in FIG. 3 are merely exemplary. The effect of the user selecting the "Widgets" tab at the bottom of the left-hand menu to bring up the widgets toolbox panel will now be discussed with respect to FIG. 4.

Figure 4:
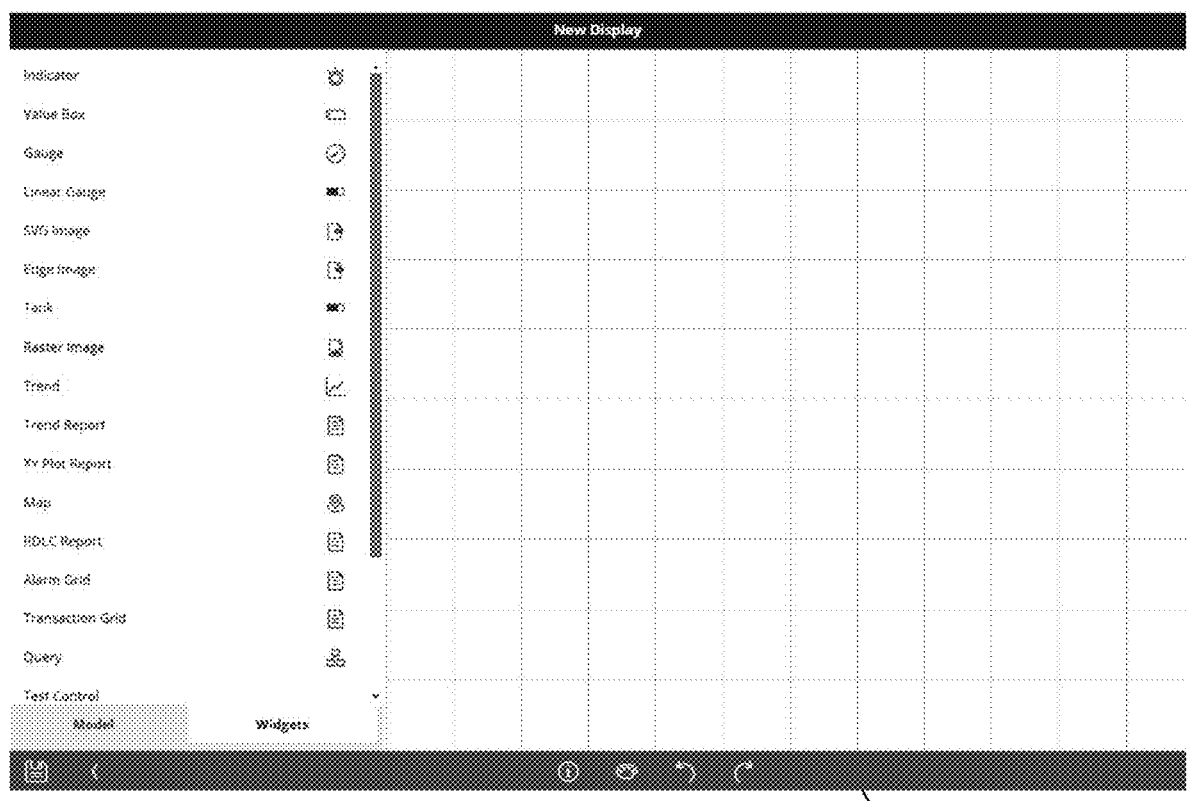

FIG. 4 provides another operational scenario involving computing system 110 in an exemplary implementation. In this example, the user has selected the tab labeled "Widgets" at the bottom of the left-hand side menu of the display composer interface, instead of the "Model" tab as shown in FIG. 3. Selecting the "Widgets" tab displays the widgets toolbox panel which provides the user with several different display items. In particular, the user can select from an indicator, value box, gauge, linear gauge, Scalable Vector Graphics (SVG) image, edge image, tank, raster image, trend, trend report, XY plot report, map, Report Definition Language Client (RDLC) report, alarm grid, transaction grid, query, test control, and others. In some examples, additional types of reports, charts, and other widgets and data types may also be shown when the "Widgets" tab is selected and may be available for the user to select but are not shown in FIG. 4 for clarity.

To begin designing a customized display or dashboard, the user could drag one of the data types listed in the "Widgets" menu on the left-hand side pane over to the right-hand side display canvas, causing a blank widget of the type selected to appear in the display composer. The user then typically assigns a particular data source to the blank widget, such as the pump speed of a particular machine or any other value. The user can further customize the display by resizing the widget, defining custom display attributes and other properties, and positioning the widget in a desired area of the display screen, among other functionality. Examples of these and other features will now be described with respect to FIGS. 5A-11D.

Figure 5A:
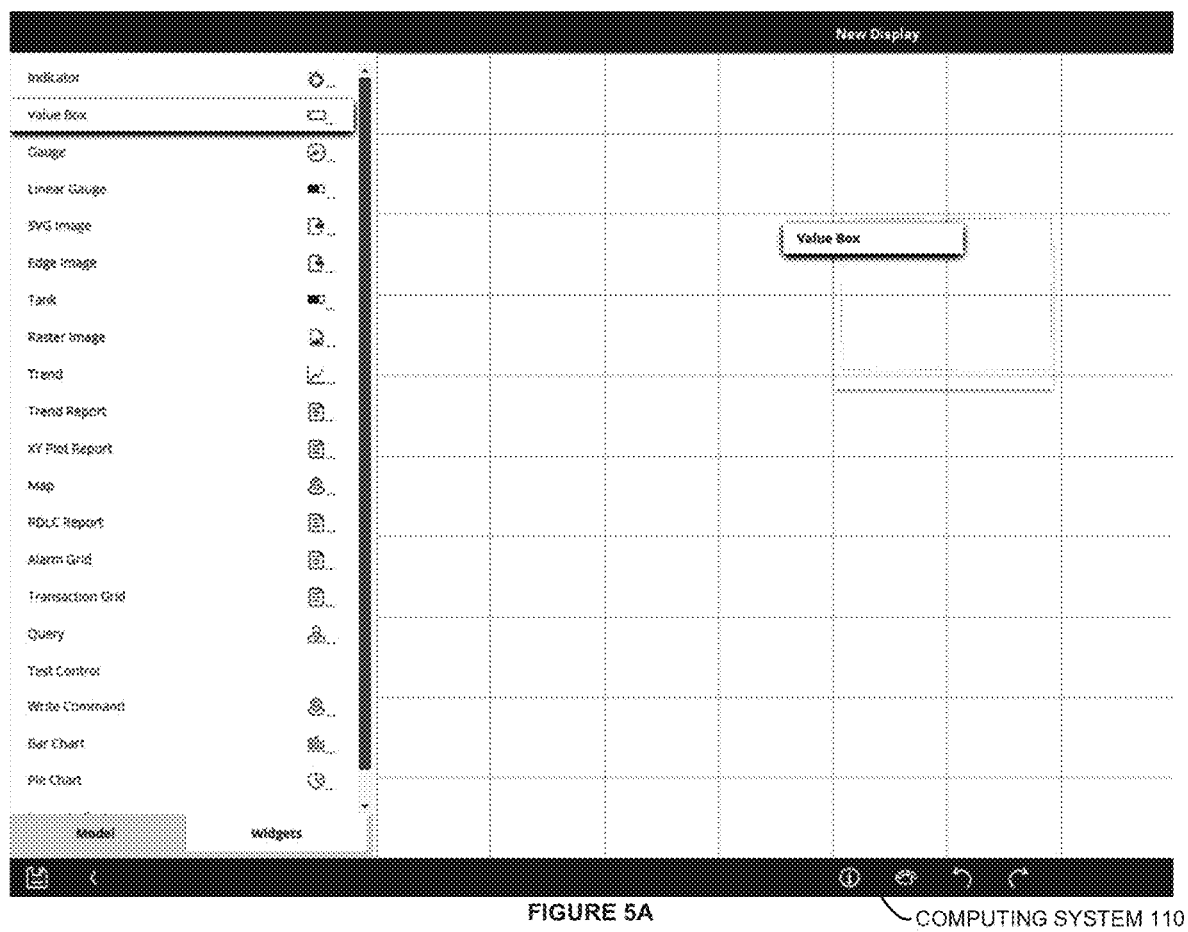
Figure 5B:
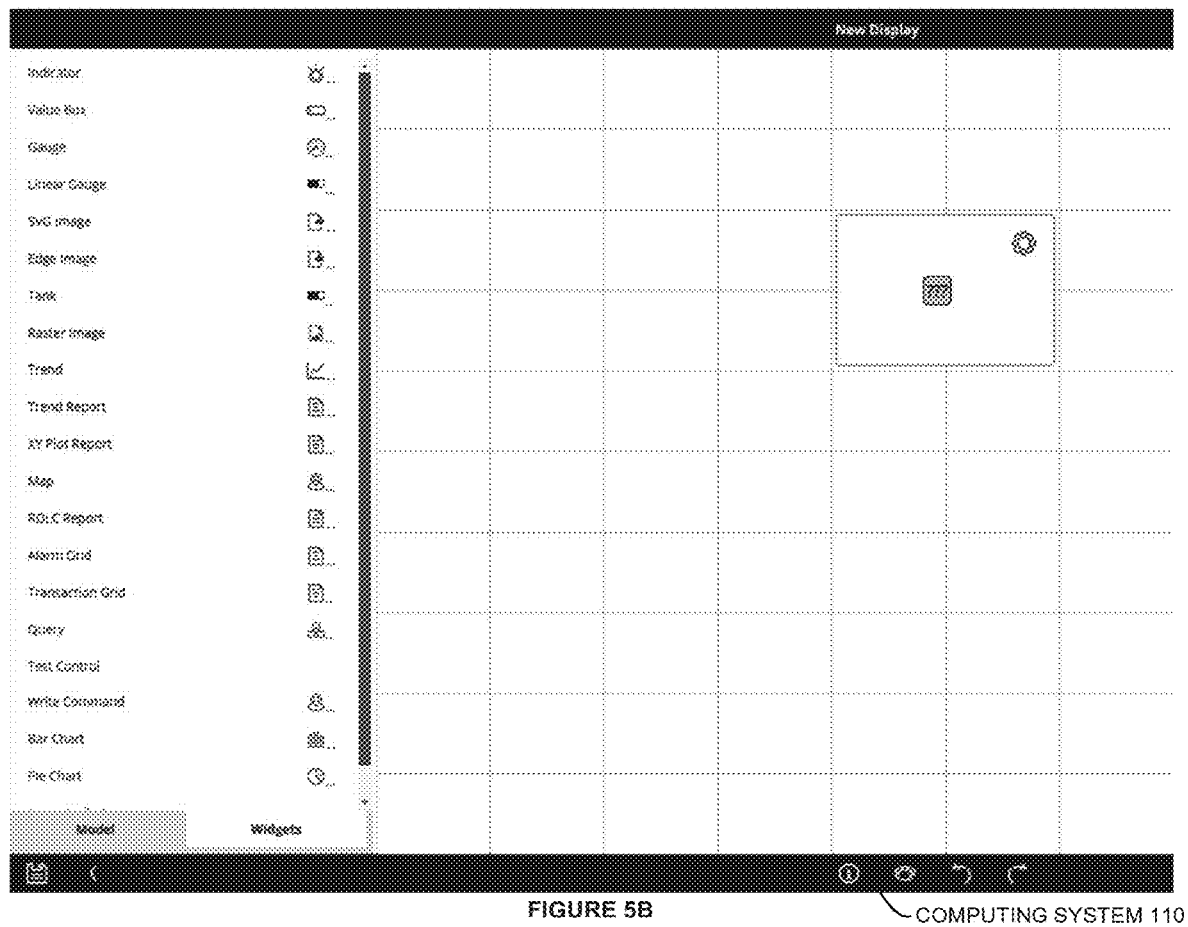

FIGS. 5A and 5B are block diagrams that illustrate an operational scenario involving computing system 110 in an exemplary implementation. FIG. 5A depicts a display composer interface with a user adding a widget to an empty display canvas. Specifically, the user has selected a "value box" widget from the widget toolbox panel and has dragged the value box widget into the right-hand display canvas grid. While the user is dragging the widget over the grid, a placeholder appears on the grid which indicates the position where the widget will be inserted after the user "drops" the widget, as shown by the dotted line forming the box that appears below the words "Value Box" on the display canvas editor. FIG. 5B illustrates the effect of the user dropping the "Value Box" widget on the grid of the display canvas. After the user positions the "Value Box" widget as shown in FIG. 5A and selects to "drop" the widget onto the display canvas grid, a blank "Value Box" widget appears on the canvas grid as shown in FIG. 5B. The value box appearing in FIG. 5B has question marks shown within it because the user has not yet assigned a value to the value box. The user could assign any value for display in the value box by clicking on the "gear" icon in the upper right-hand corner of the value box widget to access the widget's properties menu. An example of a user selecting a data item from the "Model" toolbox panel to add a widget to a display design canvas will now be discussed with respect to FIGS. 6A and 6B.

Figure 6A:
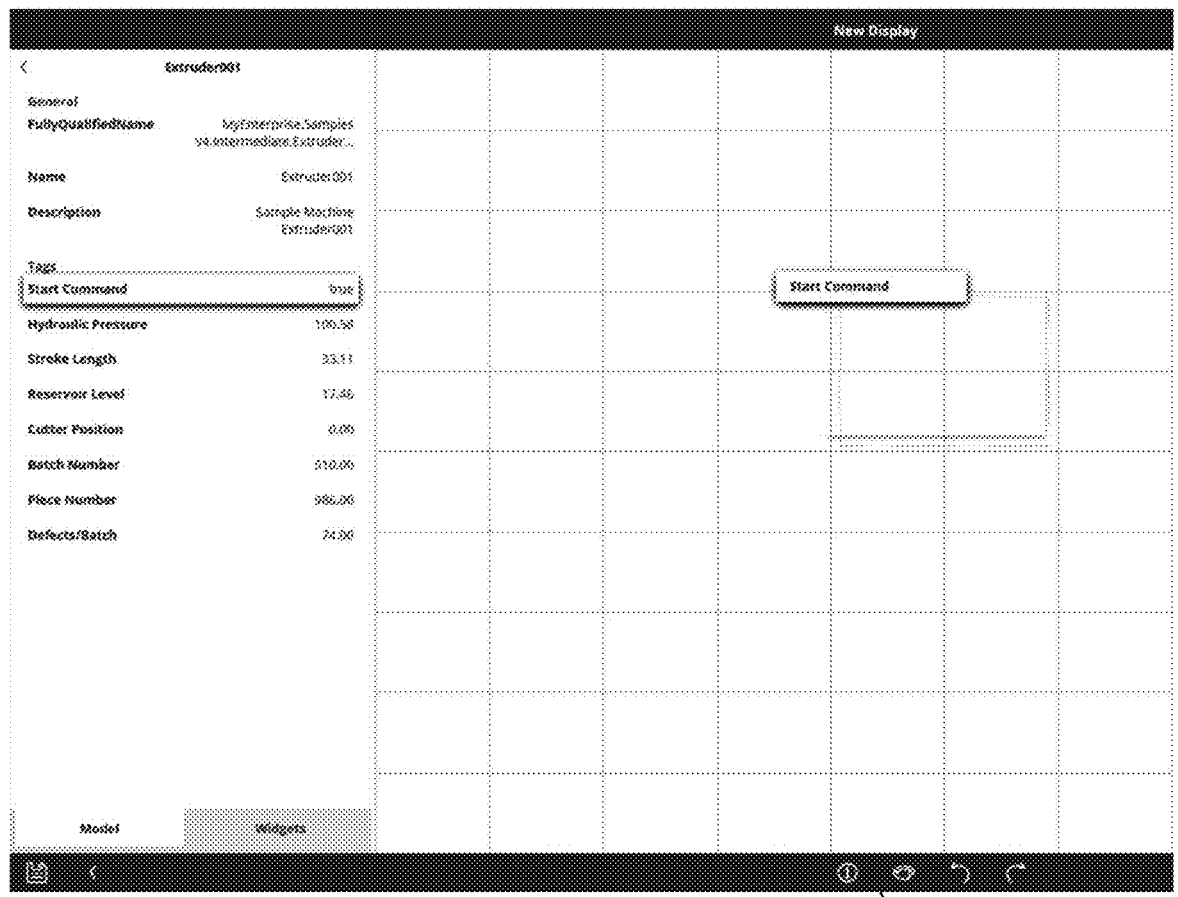
Figure 6B:
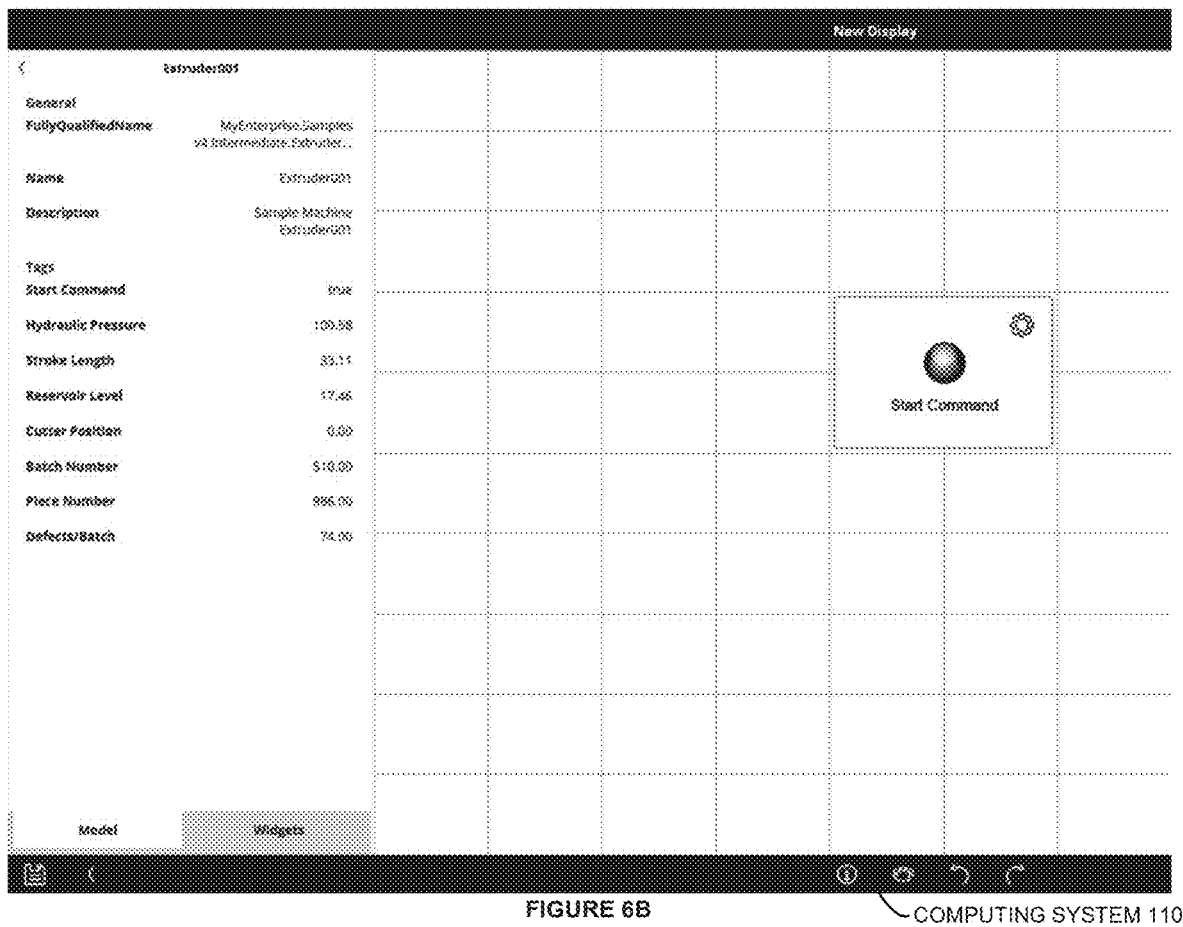

FIGS. 6A and 6B are block diagrams that illustrate an operational scenario involving computing system 110 in an exemplary implementation. FIG. 6A depicts a display composer interface with a user adding a widget to an empty display canvas selected from the "Model" toolbox panel. Specifically, the user has selected a "Start Command" data item from the "Tags" menu of the "Model" toolbox panel and has dragged the "Start Command" into the right-hand display canvas grid. While the user is dragging the data tag over the grid, a placeholder appears on the grid which indicates the position where the widget for the data tag will be inserted after the user "drops" the tag, as shown by the dotted line forming the box that appears below the words "Start Command" on the display canvas editor of FIG. 6A. FIG. 6B illustrates the effect of the user dropping the "Start Command" data tag on the grid of the display canvas. After the user positions the "Start Command" data tag as shown in FIG. 6A and selects to "drop" the tag onto the display canvas grid, a default widget for the "Start Command" data type appears on the canvas grid as shown in FIG. 6B. In this case, the default widget for the "Start Command" data tag is an indicator widget, so an indicator light widget appears in the design canvas of FIG. 6B at the location where the user dropped the tag, and the indicator widget is automatically assigned the "Start Command" data tag value for the "Extruder001" machine. In general, dragging a data tag value from the left-hand "Model" toolbox panel to the right-hand display design canvas side will result in the value being displayed visually with a compatible widget, but the user is able to edit the properties of the default widget to select a different display type from a list of compatible widgets, such as an indicator, value box, trend diagram, or any other type of visualization element. The user could also assign a different data tag value to the widget by editing the widget's properties. An example of widget behavior when a user attempts to position a widget in the same space on the canvas grid where another widget is already positioned will now be described with respect to FIGS. 7A and 7B.

Figure 7A:
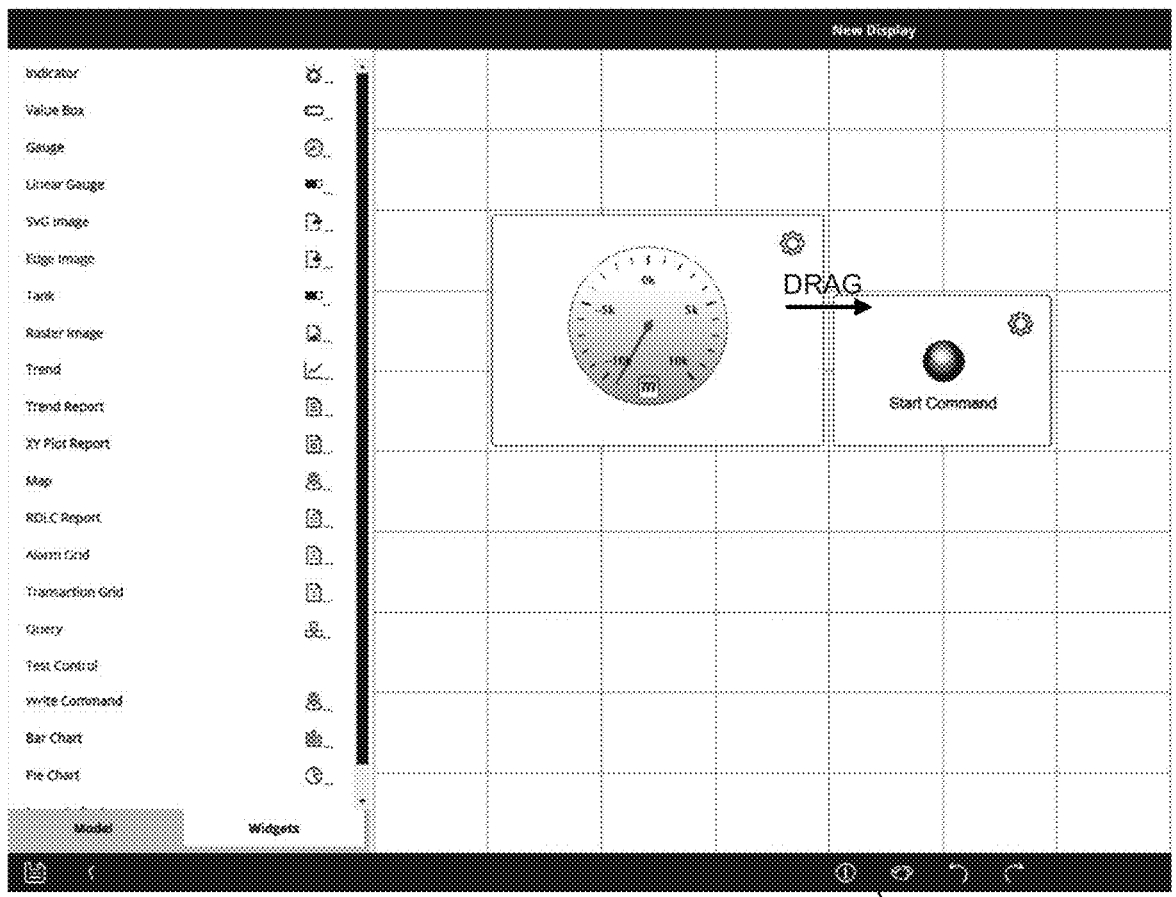
Figure 7B:
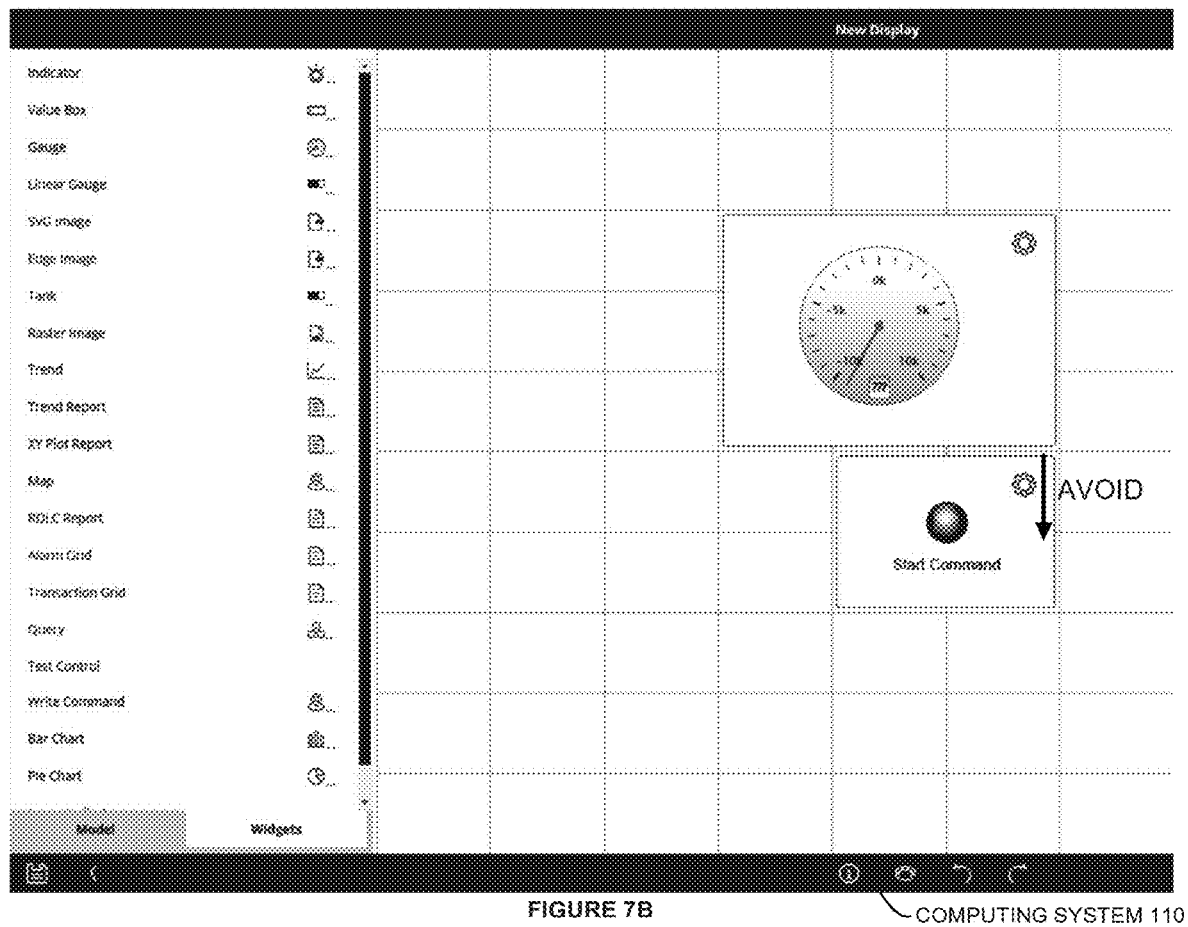

FIGS. 7A and 7B are block diagrams that illustrate an operational scenario involving computing system 110 in an exemplary implementation. In FIG. 7A, a user has positioned an indicator widget on the display canvas and assigned a "Start Command" tag value to the widget. Subsequently, the user selects a "Gauge" widget from the left-hand "Widgets" toolbox panel. The user has not yet assigned a value to the gauge, so the gauge displays questions marks instead of an actual value. In this example, the user is in the process of dragging the gauge over to the right, as indicated by the arrow appearing in FIG. 7A. As the user drags the gauge over the existing "Start Command" indicator widget that is already positioned on the grid, the indicator widget is configured to move out of the way and make space for the gauge widget that is colliding with it. Thus, as shown by the arrow appearing in FIG. 7B, the "Start Command" indicator widget automatically moves downward to avoid the new gauge widget as the user drags the gauge into the space on the grid formerly occupied by the "Start Command" indicator. Note that although the "Start Command" indicator widget moves downward in this example to make room for the gauge, the existing indicator widget could also avoid the overlapping gauge widget by automatically moving in any other direction in other examples. Also, this avoiding mechanism occurs whenever a user drags one widget over another, whether that widget was just dragged from the widget toolbox panel or the user is re-positioning an existing widget inside the display composer canvas. An example of widget behavior when a user drags a data item from the "Model" toolbox panel onto an existing widget will now be described with respect to FIGS. 8A and 8B.

Figure 8A:
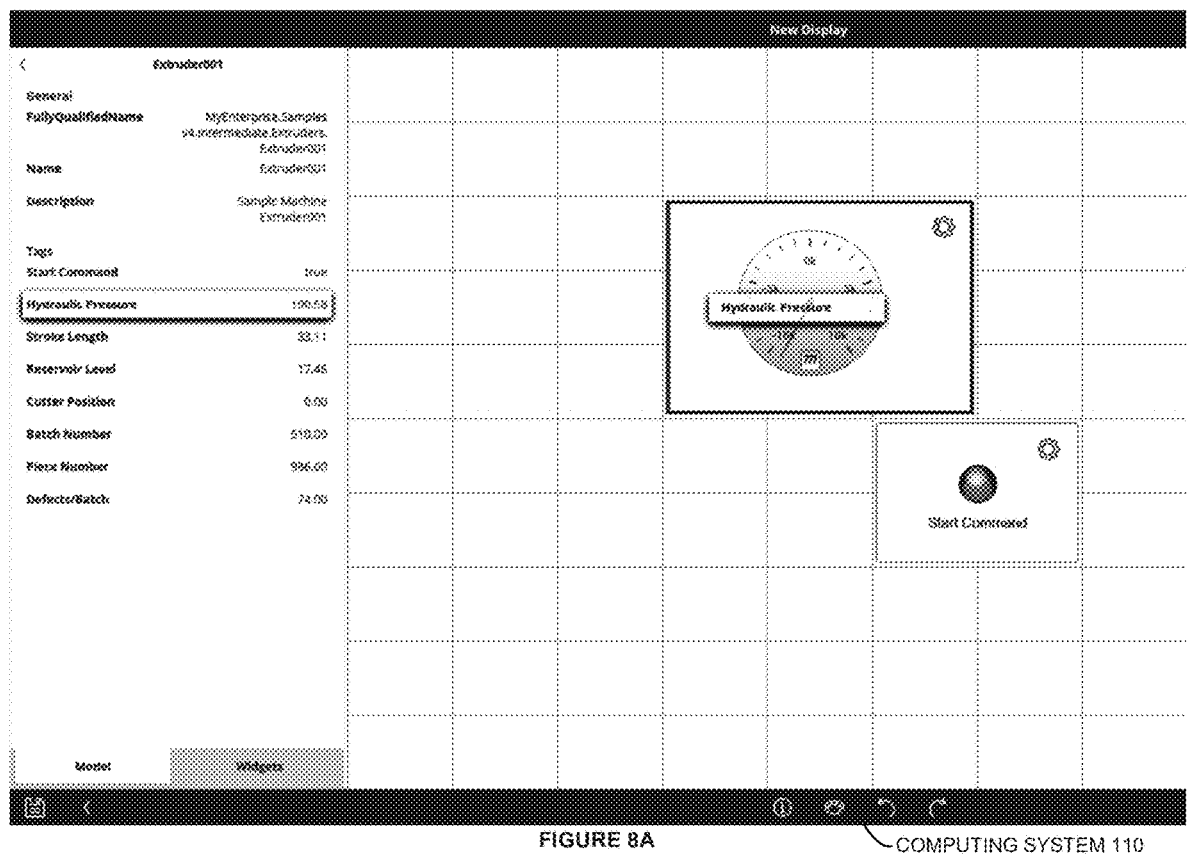
Figure 8B:
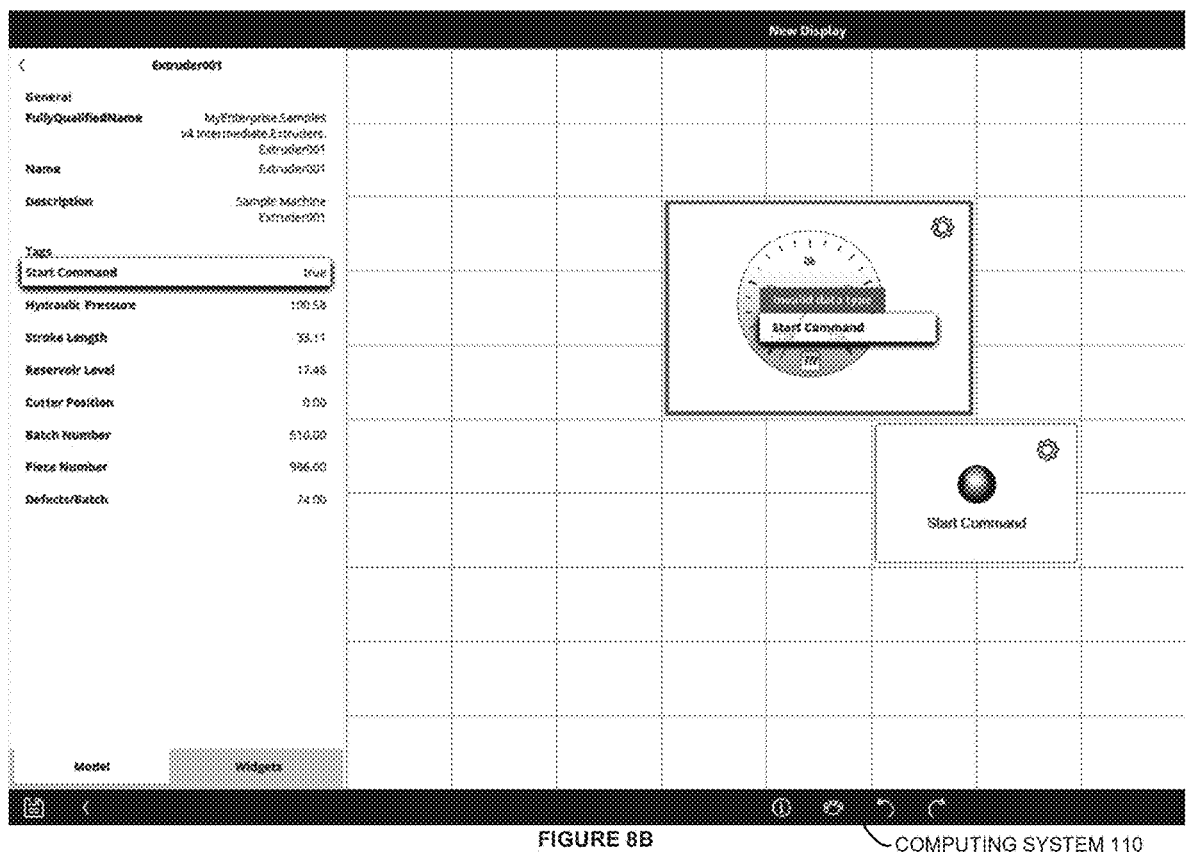

FIGS. 8A and 8B are block diagrams that illustrate an operational scenario involving computing system 110 in an exemplary implementation. In FIG. 8A, a user has positioned an indicator widget on the display canvas and assigned a "Start Command" tag value to the widget. Subsequently, the user has positioned a blank "Gauge" widget from the left-hand "Widgets" toolbox panel above the "Start Command" indictor on the canvas grid, which initially does not have a value assigned to it. In order to assign a value, the user selects the "Hydraulic Pressure" data item from the "Tags" section of the "Model" toolbox panel and drags the data tag over to the blank gauge widget. Instead of the gauge widget automatically moving out of the way of the new data tag when it is dragged onto the gauge widget as discussed above with respect to FIGS. 7A and 7B when the user drags a widget over another widget, this avoiding mechanism is suppressed. In this case, the widget reacts instead by indicating whether or not the data type of the tag the user dragged onto the widget is compatible with that widget type, such as by changing its boarder color when a data tag is dragged onto it to indicate compatibility. For example, the widget could display a blue boarder to indicate that the widget is compatible with the data type of the tag and is able to visualize this type of tag, or could display a red color to indicate that the widget is incompatible with the data type of the tag and thus unable to visualize the tag. The widget could indicate compatibility with a data item that is dragged onto it by other means as well, such as by displaying a textual notification to the user. As illustrated in FIG. 8A, the user drags a compatible data tag of "Hydraulic Pressure" onto the blank gauge widget, so the gauge widget reacts by changing its boarder color to blue to indicate to the user that the gauge widget can visualize the "Hydraulic Pressure" data value. Conversely, FIG. 8B illustrates the behavior when the user attempts to drag an incompatible "Start Command" data tag onto the gauge widget, which reacts by displaying a red boarder color on the gauge widget and a notification of "Invalid data type" to the user. An example of a user resizing a widget will now be discussed with respect to FIGS. 9A and 9B.

Figure 9A:
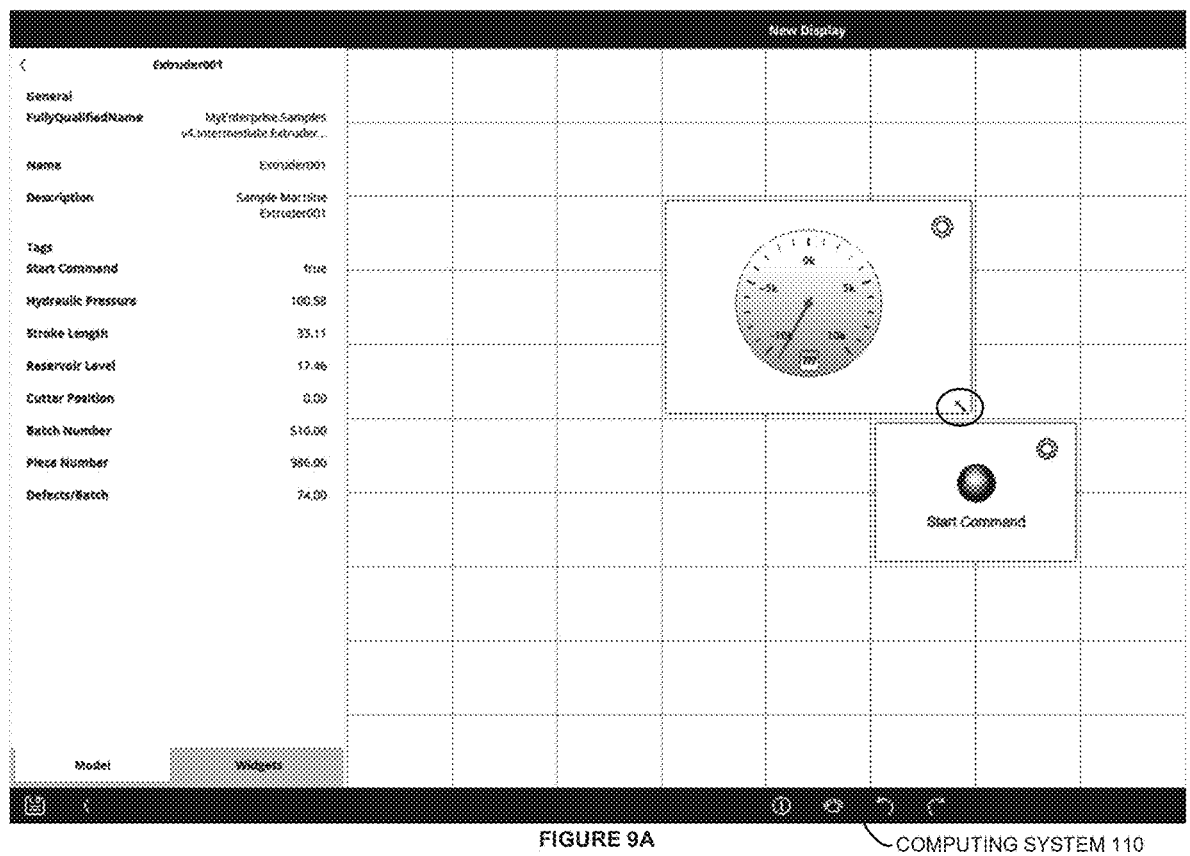
Figure 9B:
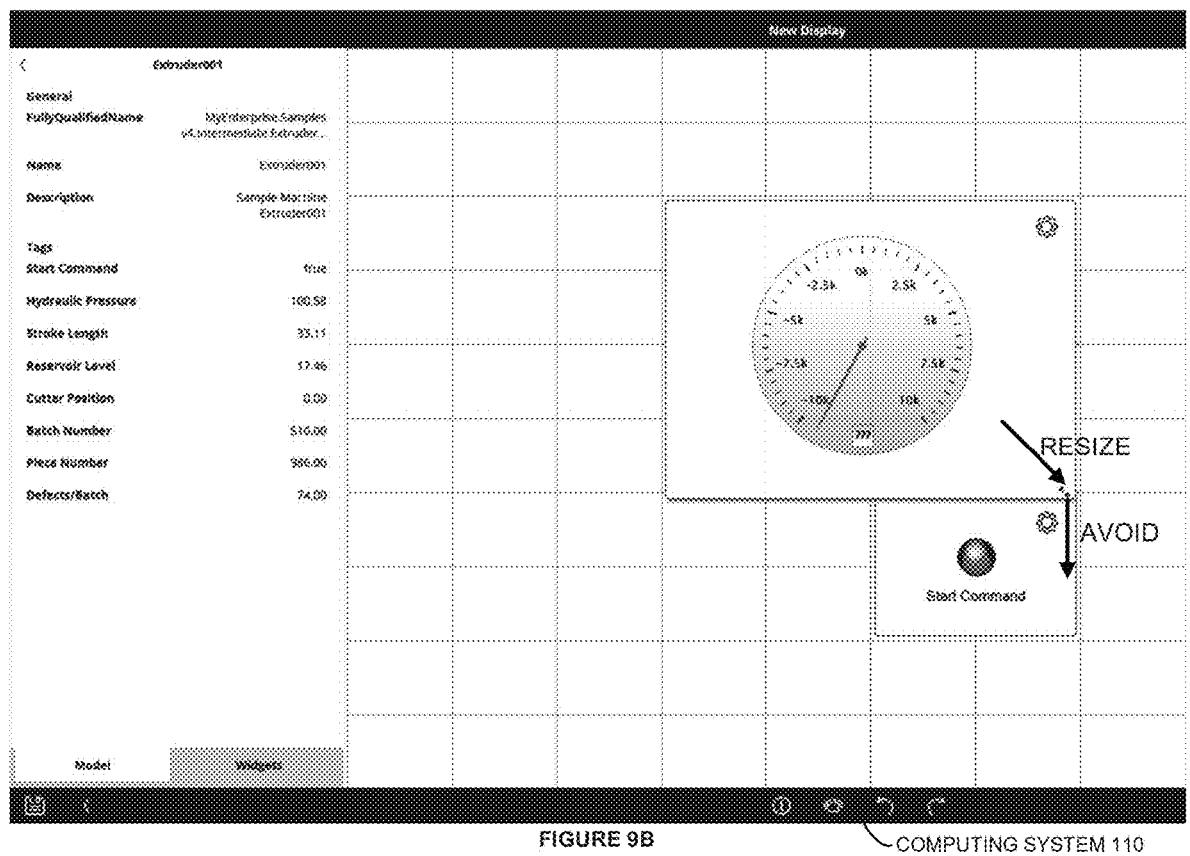

FIGS. 9A and 9B are block diagrams that illustrate an operational scenario involving computing system 110 in an exemplary implementation. In FIG. 9A, a user has positioned an indicator widget on the display canvas and assigned a "Start Command" tag value to the widget. The user has also selected a "Gauge" widget from the left-hand "Widgets" toolbox panel and has positioned the gauge on the canvas grid above the "Start Command" indicator widget. The user has not yet assigned a value to the gauge, so the gauge displays questions marks instead of an actual value. In order to resize the gauge widget, the user can hover a cursor over the bottom right-hand corner of the widget, which causes a resize arrow icon to be displayed. To facilitate this discussion, a circle surrounds the resize arrow icon in FIG. 9A to highlight the resize option, but note that the resize arrow icon is not typically encircled on the application's user interface. Once selected, the user can drag the corner of the gauge widget to resize the widget graphic. In this example, the user increases the size of the gauge widget as shown in FIG. 9B, but the user could also decrease the size of the widget by dragging the corner in the opposite direction. As illustrated in FIG. 9B, the avoiding mechanism described in FIG. 7B above is also enabled, so that the "Start Command" indicator widget automatically moves down and out of the way of the expanding gauge widget as it is resized. An example of a user accessing a context menu to adjust properties of a widget will now be discussed with respect to FIGS. 10A, 10B, and 10C.

Figure 10B:
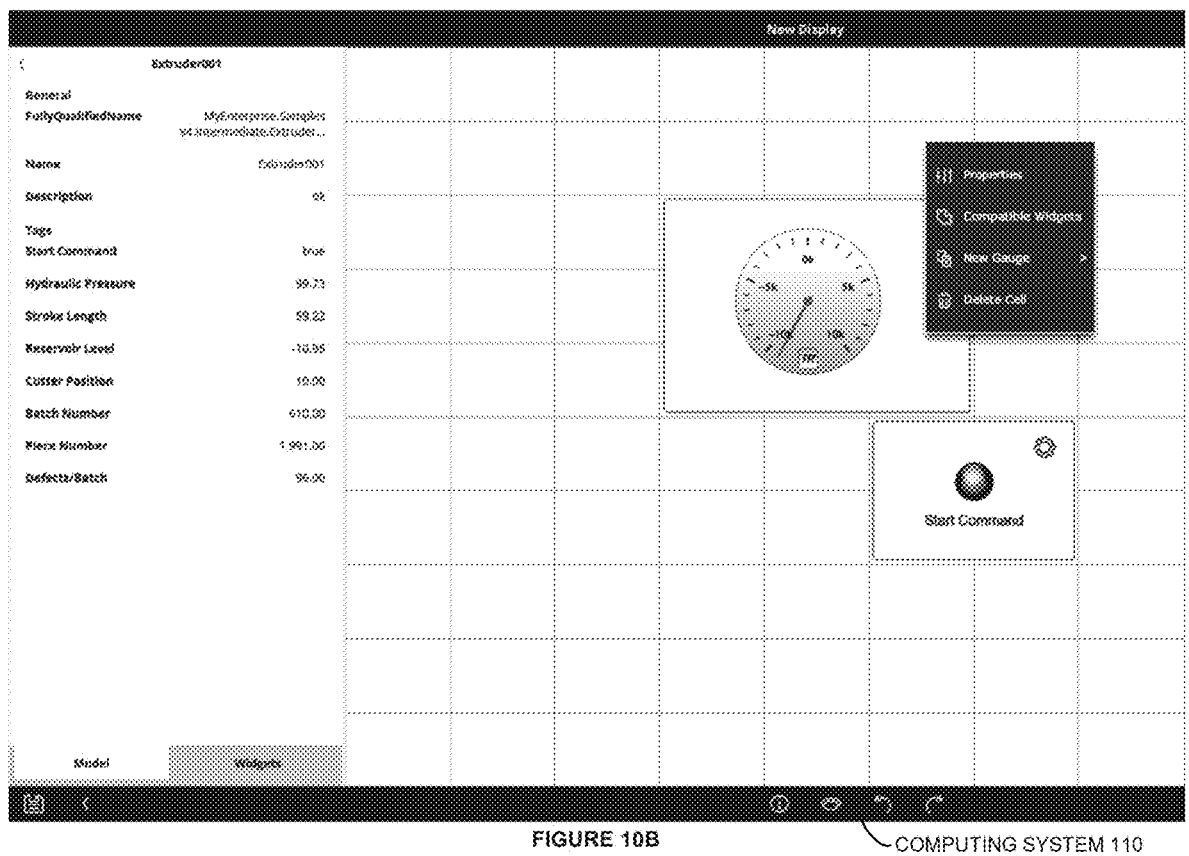
Figure 10C:
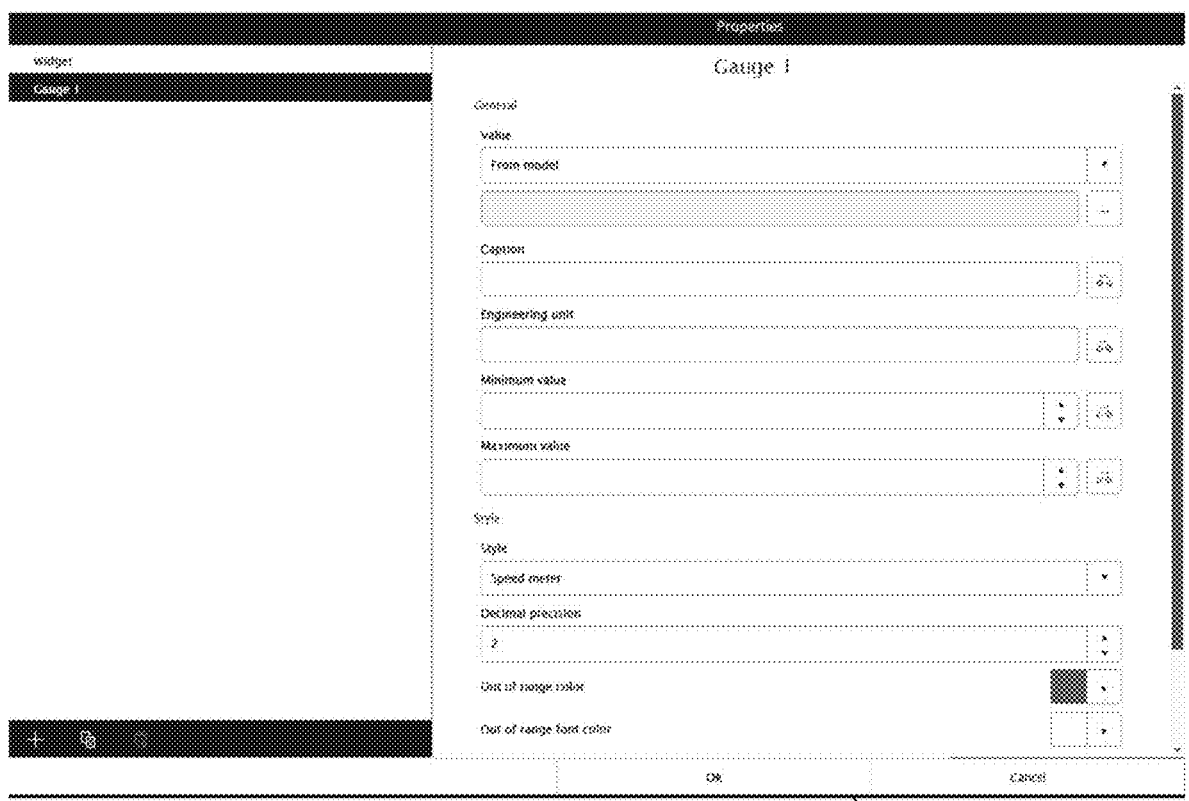

FIGS. 10A, 10B, and 10C are block diagrams that illustrate an operational scenario involving computing system 110 in an exemplary implementation. Each widget has a "gear" icon appearing in the top-right corner of the widget, as shown encircled on the gauge widget in FIG. 10A for the purpose of highlighting this feature. When selected, the gear icon brings up a context menu associated with the widget, as shown in FIG. 10B. In this example, the context menu provides the user with the ability to select "Properties" of the widget, open a list of "Compatible Widgets", add a new gauge widget instance using the "New Gauge" option, or delete the widget. Note that the options shown in the context menu of FIG. 10B are merely exemplary, and other types of menu options are possible and within the scope of this disclosure. The effect of the user selecting the "Properties" option from the context menu in FIG. 10B is illustrated in FIG. 10C. An example of configurable properties for the "Gauge 1" widget is shown in FIG. 10C. Each widget type may have different configurable properties, and the user can configure the properties of each individual widget appearing on a display composer canvas. In the properties window, the user is able to set various attributes of the gauge. For example, the value for the gauge is currently set to receive the data from the model, but the user is able to change the value to point to a different data source if desired. The user can also add a caption for the gauge, such as a description of what value the gauge is displaying. Further, the user can specify the engineering unit for the gauge, and set the gauge range by entering values into the minimum and maximum value boxes. The user can also change the style of the gauge, which is set to "Speed meter" in this example. The level of decimal precision for the gauge can also be set, along with the behavior when the data displayed by the gauge is outside of the range, such as an out-of-range color or font color. Of course, the number and type of options that are shown in the properties window will differ depending on the type of widget selected and the value being represented by the widget, among other factors. The properties shown for the gauge in FIG. 10C are merely exemplary. An example of different display style options for a user's customized display will now be discussed with respect to FIGS. 11A, 11B, 11C, and 11D.

Figure 11A:
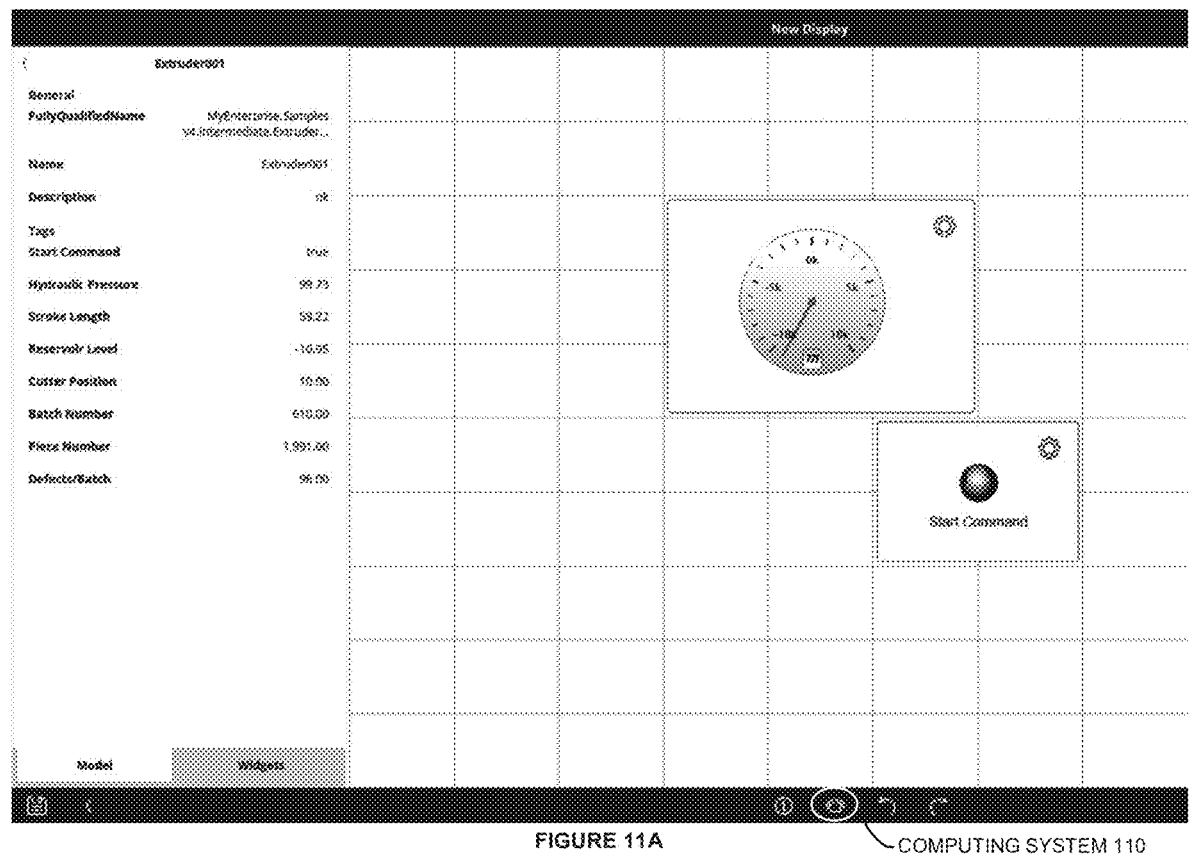
Figure 11B:
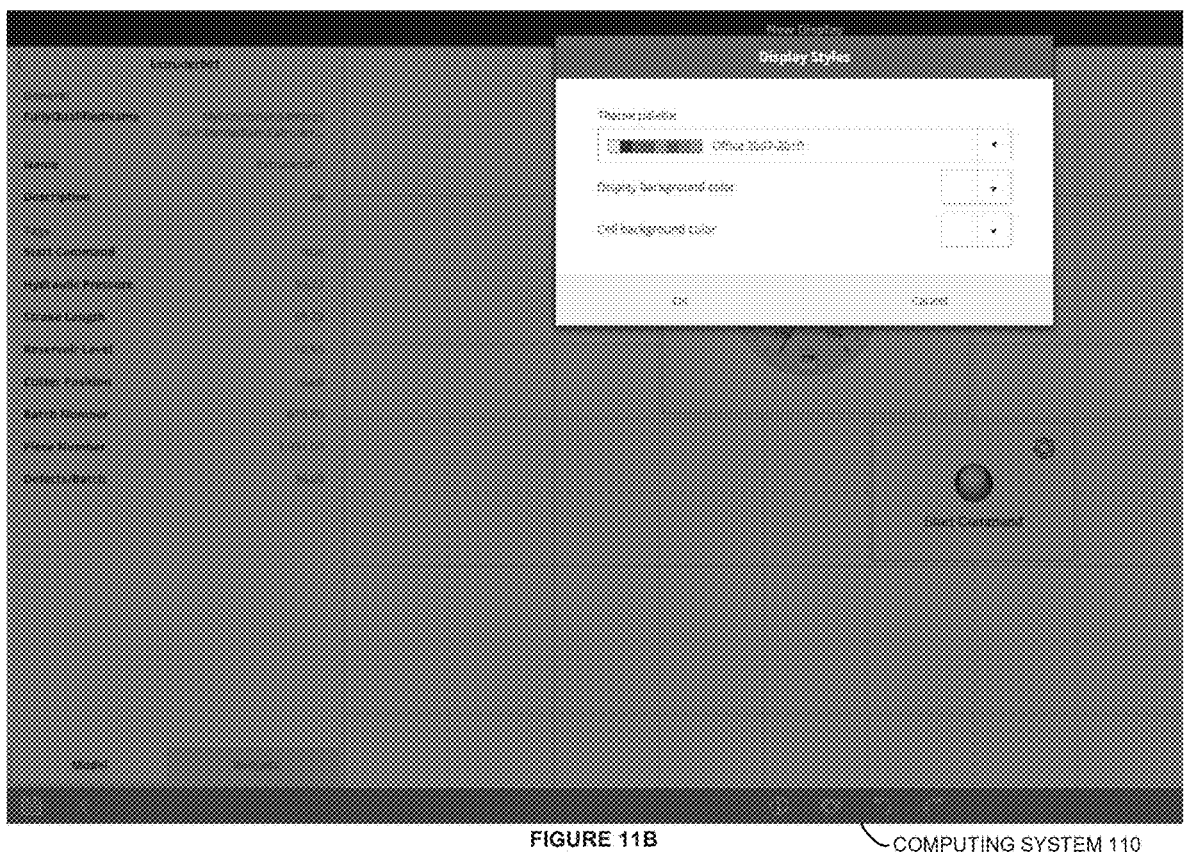
Figure 11C:
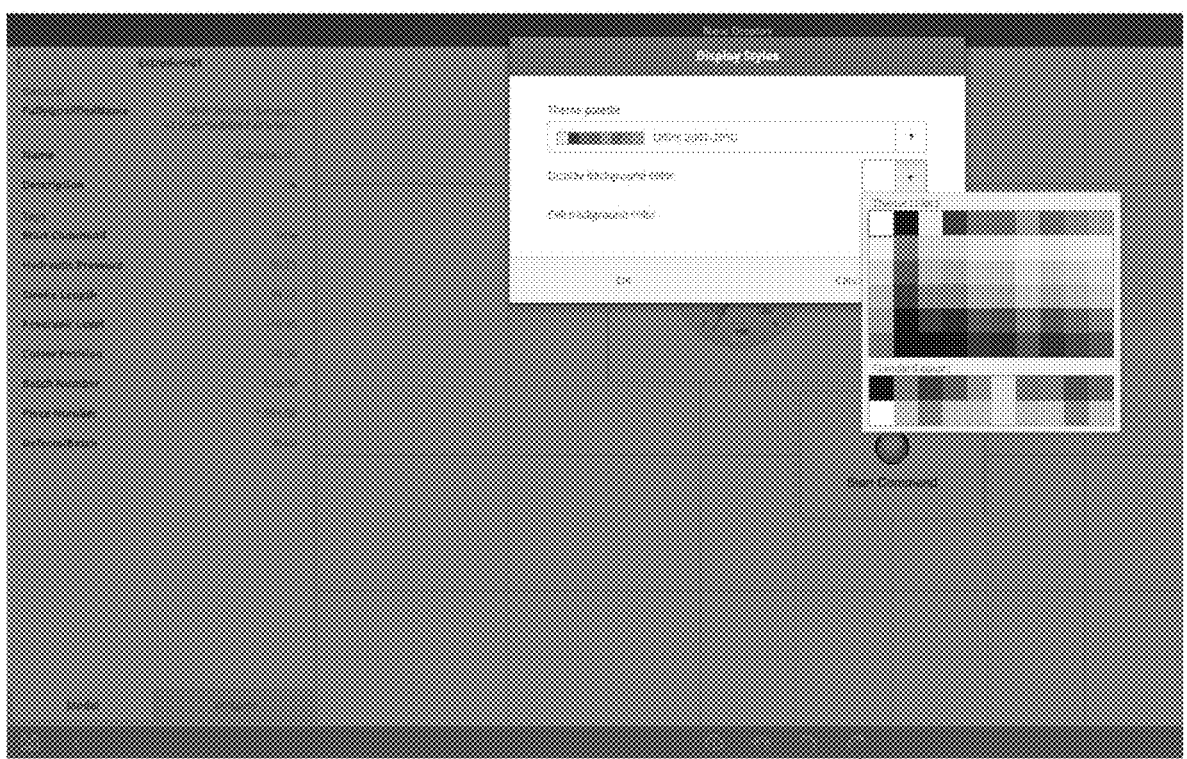
Figure 12:
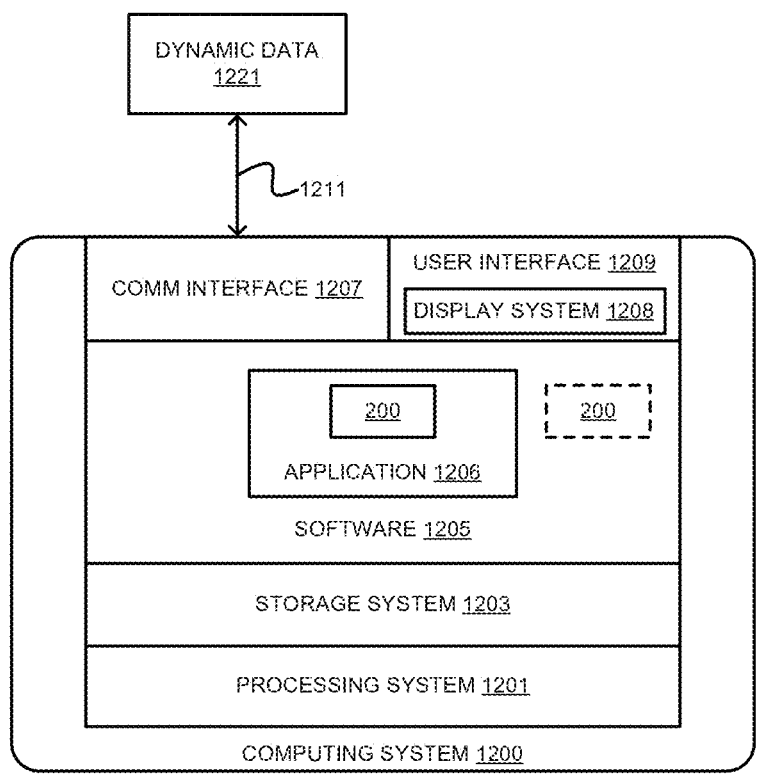
FIG. 12 is a block diagram that illustrates a computing system in an exemplary implementation.

FIGS. 11A, 11B, 10C, and 11D are block diagrams that illustrate an operational scenario involving computing system 110 in an exemplary implementation. At the bottom of the display composer interface, the user is presented with an option to adjust display styles for the entire display. The display styles dialog menu is shown encircled in FIG. 11A for the purpose of highlighting this feature. When selected, the display styles option brings up the "Display Styles" menu for editing the display style for the entire display, as shown in FIG. 11B. In this example, the Display Styles" menu provides the user with the ability to change the "Theme palette", alter the "Display background color", and change the "Cell background color" of a particular widget. Note that the display options shown in the "Display Styles" menu on FIG. 11B are merely exemplary, and other types of menu options are possible and within the scope of this disclosure. In FIG. 11C, the user has activated the color selector for the "Display background color" option. The color selector is broken up into two sections, labeled "Theme colors" and "Standard colors". The theme colors depend on the selected theme palette. When the theme color palette is changed, all display items that are using theme colors are changed. The standard colors are static, and thus any display items that are assigned a color from the "Standard colors" selection are unaffected if the theme palette is changed. In this example, the user changes the display background color to orange and the cell background color to red. An example of a "styled" display is illustrated in FIG. 11D, which reflects the user's changes of to background color for the display canvas and a different background color for the widgets. In this manner, the user is able to create fully customized displays and dashboards for viewing dynamic data associated with industrial automation operations in a style and layout as desired by the user.

Referring now to FIG. 12, a block diagram that illustrates computing system 1200 in an exemplary implementation is shown. Computing system 1200 provides an example of computing system 110, although system 110 could use alternative configurations. Computing system 1200 includes processing system 1201, storage system 1203, software 1205, communication interface 1207, and user interface 1209. User interface 1209 comprises display system 1208. Software 1205 includes application 1206 which itself includes visualization process 200. However, in some implementations, visualization process 200 may optionally be implemented separately from application 1206, as shown by the dotted line around the graphical representation of process 200 appearing outside of application 1206.

Computing system 1200 may be representative of any computing apparatus, system, or systems on which application 1206 and visualization process 200 or variations thereof may be suitably implemented. Examples of computing system 1200 include mobile computing devices, such as cell phones, tablet computers, laptop computers, notebook computers, and gaming devices, as well as any other type of mobile computing devices and any combination or variation thereof. Note that the features and functionality of computing system 1200 may apply as well to desktop computers, server computers, and virtual machines, as well as any other type of computing system, variation, or combination thereof.

Computing system 1200 includes processing system 1201, storage system 1203, software 1205, communication interface 1207, and user interface 1209. Processing system 1201 is operatively coupled with storage system 1203, communication interface 1207, and user interface 1209. Processing system 1201 loads and executes software 1205 from storage system 1203. When executed by computing system 1200 in general, and processing system 1201 in particular, software 1205 directs computing system 1200 to operate as described herein for a visualization process or variations thereof. Computing system 1200 may optionally include additional devices, features, or functionality not discussed herein for purposes of brevity.

Referring still to FIG. 12, processing system 1201 may comprise a microprocessor and other circuitry that retrieves and executes software 1205 from storage system 1203. Processing system 1201 may be implemented within a single processing device but may also be distributed across multiple processing devices or sub-systems that cooperate in executing program instructions. Examples of processing system 1201 include general purpose central processing units, application specific processors, and logic devices, as well as any other type of processing device, combinations, or variations thereof.

Storage system 1203 may comprise any computer readable media or storage media readable by processing system 1201 and capable of storing software 1205. Storage system 1203 may include volatile and nonvolatile, removable and non-removable media implemented in any method or technology for storage of information, such as computer readable instructions, data structures, program modules, or other data. Storage system 1203 may be implemented as a single storage device but may also be implemented across multiple storage devices or sub-systems co-located or distributed relative to each other. Storage system 1203 may comprise additional elements, such as a controller, capable of communicating with processing system 1201. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 1209, processing system 1201 loads and executes portions of software 1205, such as application 1206 and/or visualization process 200, to render a graphical user interface for application 1206 for display by display system 1208 of user interface 1209. Software 1205 may be implemented in program instructions and among other functions may, when executed by computing system 1200 in general or processing system 1201 in particular, direct computing system 1200 or processing system 1201 to present a display composer interface that enables a user to design a customized display layout for the application associated with the industrial automation environment. Software 1205 may further direct computing system 1200 or processing system 1201 to receive data display instructions comprising a user selection of at least one data item associated with an operation of a machine in the industrial automation environment, and receive position information that identifies where to display the at least one data item. Software 1205 may also direct computing system 1200 or processing system 1201 to process the data display instructions and the position information to generate the customized display layout for the application. In addition, software 1205 may direct computing system 1200 or processing system 1201 to, based on the customized display layout, render a graphical user interface to the application having the at least one data item positioned according to the position information.

Software 1205 may include additional processes, programs, or components, such as operating system software or other application software. Examples of operating systems include Windows®, iOS®, and Android®, as well as any other suitable operating system. Software 1205 may also comprise firmware or some other form of machine-readable processing instructions executable by processing system 1201.

In general, software 1205 may, when loaded into processing system 1201 and executed, transform computing system 1200 overall from a general-purpose computing system into a special-purpose computing system customized to facilitate visualization of an application as described herein for each implementation. For example, encoding software 1205 on storage system 1203 may transform the physical structure of storage system 1203. The specific transformation of the physical structure may depend on various factors in different implementations of this description. Examples of such factors may include, but are not limited to the technology used to implement the storage media of storage system 1203 and whether the computer-storage media are characterized as primary or secondary storage.

In some examples, if the computer-storage media are implemented as semiconductor-based memory, software 1205 may transform the physical state of the semiconductor memory when the program is encoded therein. For example, software 1205 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 1200 is generally intended to represent a computing system with which software 1205 is deployed and executed in order to implement application 1206 and/or visualization process 200 (and variations thereof). However, computing system 1200 may also represent any computing system on which software 1205 may be staged and from where software 1205 may be distributed, transported, downloaded, or otherwise provided to yet another computing system for deployment and execution, or yet additional distribution. For example, computing system 1200 could be configured to deploy software 1205 over the internet to one or more client computing systems for execution thereon, such as in a cloud-based deployment scenario.

Communication interface 1207 may include communication connections and devices that allow for communication between computing system 1200 and other computing systems (not shown) or services, over a communication network 1211 or collection of networks. In some implementations, communication interface 1207 receives dynamic data 1221 over communication network 1211. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 1209 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 1209. In this example, user interface 1209 includes display system 1208, which itself may be part of a touch screen that also accepts user inputs via touches on its surface. The aforementioned user input devices are well known in the art and need not be discussed at length here. User interface 1209 may also include associated user interface software executable by processing system 1201 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system to facilitate visualization of an application associated with an industrial automation environment, the method comprising:
    presenting a display composer interface comprising a visualization layout editor for designing a customized display layout for the application associated with the industrial automation environment;
    receiving data display instructions comprising an indication of at least one data item associated with an operation of a machine in the industrial automation environment and a data display type for displaying the at least one data item, wherein a default data display type compatible with the at least one data item is automatically created for the at least one data item and the at least one data item is automatically assigned to the default data display type which serves as the data display type for displaying the at least one data item;
    receiving position information that identifies where to display the at least one data item;
    processing the data display instructions and the position information to generate the customized display layout for the application; and
    rendering a graphical user interface to the application having the at least one data item displayed according to the data display type and positioned according to the position information.

2. The method of claim 1 wherein receiving the data display instructions comprises receiving display size instructions for the at least one data item.

3. The method of claim 1 wherein processing the data display instructions and the position information to generate the customized display layout for the application comprises altering the position information that identifies where to display the at least one data item to avoid overlapping with other data items that were previously positioned in the customized display layout.

4. The method of claim 1 wherein receiving the data display instructions comprising the user selection of the at least one data item and the data display type for displaying the at least one data item comprises receiving instructions to edit properties of the default data display type to select a different data display type from a list of compatible data display types to serve as the data display type for displaying the at least one data item.

5. The method of claim 1 wherein the data display type comprises an indicator.

6. The method of claim 1 wherein the data display type comprises a gauge.

7. The method of claim 1 wherein the data display type comprises a value box.

8. One or more computer-readable storage media having program instructions stored thereon to facilitate visualization of an application associated with an industrial automation environment, wherein the program instructions, when executed by a computing system, direct the computing system to at least:
    present a display composer interface comprising a visualization layout editor for designing a customized display layout for the application associated with the industrial automation environment;
    receive data display instructions comprising an indication of at least one data item associated with an operation of a machine in the industrial automation environment and a data display type for displaying the at least one data item, wherein a default data display type compatible with the at least one data item is automatically created for the at least one data item and the at least one data item is automatically assigned to the default data display type which serves as the data display type for displaying the at least one data item;
    receive position information that identifies where to display the at least one data item;
    process the data display instructions and the position information to generate the customized display layout for the application; and
    based on the customized display layout, render a graphical user interface to the application having the at least one data item displayed according to the data display type and positioned according to the position information.

9. The one or more computer-readable storage media of claim 8 wherein the program instructions direct the computing system to receive the data display instructions by directing the computing system to receive display size instructions for the at least one data item.

10. The one or more computer-readable storage media of claim 8 wherein the program instructions direct the computing system to process the data display instructions and the position information to generate the customized display layout for the application by directing the computing system to alter the position information that identifies where to display the at least one data item to avoid overlapping with other data items that were previously positioned in the customized display layout.

11. The one or more computer-readable storage media of claim 8 wherein the program instructions direct the computing system to receive the data display instructions comprising the user selection of the at least one data item and the data display type for displaying the at least one data item by directing the computing system to receive instructions to edit properties of the default data display type to select a different data display type from a list of compatible data display types to serve as the data display type for displaying the at least one data item.

12. The one or more computer-readable storage media of claim 8 wherein the data display type comprises an indicator.

13. The one or more computer-readable storage media of claim 8 wherein the data display type comprises a gauge.

14. The one or more computer-readable storage media of claim 8 wherein the data display type comprises a value box.

15. An apparatus to facilitate visualization of an application associated with an industrial automation environment, the apparatus comprising:
  one or more computer-readable storage media; and
  program instructions stored on the one or more computer-readable storage media that, when executed by a processing system, direct the processing system to at least:
  present a display composer interface that provides a visualization layout editor for editing a customized display layout for the application associated with the industrial automation environment;
  receive data display instructions comprising a user selection of at least one data item associated with an operation of a machine in the industrial automation environment and a data display type for displaying the at least one data item, wherein a default data display type compatible with the at least one data item is automatically created for the at least one data item identified in the user selection and the at least one data item is automatically assigned to the default data display type which serves as the data display type for displaying the at least one data item;
  receive position information that identifies where to display the at least one data item;
  process the data display instructions and the position information to generate the customized display layout for the application; and
  produce a graphical user interface to the application having the at least one data item displayed according to the data display type and positioned according to the position information.

16. The apparatus of claim 15 wherein the program instructions direct the processing system to receive the data display instructions by directing the processing system to receive display size instructions for the at least one data item.

17. The apparatus of claim 15 wherein the program instructions direct the processing system to process the data display instructions and the position information to generate the customized display layout for the application by directing the processing system to alter the position information that identifies where to display the at least one data item to avoid overlapping with other data items that were previously positioned in the customized display layout.

18. The apparatus of claim 15 wherein the program instructions direct the processing system to receive the data display instructions comprising the user selection of the at least one data item and the data display type for displaying the at least one data item by directing the processing system to receive instructions to edit properties of the default data display type to select a different data display type from a list of compatible data display types to serve as the data display type for displaying the at least one data item.

19. The apparatus of claim 15 wherein the data display type comprises an indicator.

20. The apparatus of claim 15 wherein the data display type comprises a gauge.

\* \* \* \* \*